(12) United States Patent
Feng

(10) Patent No.: US 8,974,943 B2
(45) Date of Patent: Mar. 10, 2015

(54) POWER BATTERY PACK COOLING APPARATUS

(76) Inventor: Guoan Feng, Singapore (SG)

( * ) Notice: Subject to any disclaimer, the term of this patent is extended or adjusted under 35 U.S.C. 154(b) by 84 days.

(21) Appl. No.: 13/505,741

(22) PCT Filed: Jan. 24, 2011

(86) PCT No.: PCT/SG2011/000029
§ 371 (c)(1),
(2), (4) Date: Jul. 23, 2012

(87) PCT Pub. No.: WO2012/002907
PCT Pub. Date: Jan. 5, 2012

(65) Prior Publication Data
US 2012/0282511 A1    Nov. 8, 2012

(51) Int. Cl.
*H01M 10/50* (2006.01)
*H01M 10/613* (2014.01)
*H01M 10/625* (2014.01)
*H01M 10/647* (2014.01)
*H01M 10/6557* (2014.01)
(Continued)

(52) U.S. Cl.
CPC ...... *H01M 10/5004* (2013.01); *H01M 10/5006* (2013.01); *H01M 10/5016* (2013.01); *H01M 10/5032* (2013.01); *H01M 10/5059* (2013.01); *H01M 10/5071* (2013.01); *H01M 2220/20* (2013.01)
USPC .......................................... 429/120; 429/158

(58) Field of Classification Search
CPC ............... H01M 10/5004; H01M 10/5016; H01M 10/5059; H01M 10/5071; H01M 10/5032; H01M 10/5006

USPC ................................................... 429/120, 158
See application file for complete search history.

(56) References Cited

U.S. PATENT DOCUMENTS 6,211,646 B1 *  4/2001  Kouzu et al. ................... 320/107
2002/0187390 A1 * 12/2002  Kimoto et al. .................. 429/99
2005/0153199 A1 *  7/2005  Yagi et al. ...................... 429/148

FOREIGN PATENT DOCUMENTS

DE           10101050 A1    7/2001
DE        2008098555 A1    8/2008
(Continued)

OTHER PUBLICATIONS

International Search Report for international application No. PCT/SG2011/000029 completed by the Austrian Patent Office on Sep. 22, 2011 and mailed Sep. 27, 2011 (4 pages).
(Continued)

*Primary Examiner* — Nicholas P D'Aniello
(74) *Attorney, Agent, or Firm* — Pyprus Pte Ltd

(57) ABSTRACT

Using a simple structure to facilitate a flow path delivering coolant in an even and well-distributed manner, providing efficient and effective cooling for power battery packs in electric vehicles. The heat exchange apparatus is composed of an array of cooling duct plates, with ducts for coolant to flow within, with front and back covers and their respective rubber sheets facilitating the changing of direction of the coolant, providing a pathway for the coolant to flow throughout the array. Individual cells of the battery pack will be fitted in the spaces between these ducts, connected in series by a novel system of electricity-conducting clips, forming a structure where a comprehensive, well-distributed and compact cooling pathway can exist within the battery pack.

3 Claims, 31 Drawing Sheets

(51) Int. Cl.
*H01M 10/6565* (2014.01)
*H01M 10/615* (2014.01)

(56) References Cited

FOREIGN PATENT DOCUMENTS

| DE | 102008059966 A1 | 6/2010 |
|---|---|---|
| EP | 1207581 A1 | 5/2002 |
| EP | 2246930 A2 | 11/2010 |
| WO | WO02/27816 A1 | 4/2002 |

OTHER PUBLICATIONS

Extended European Search Report of European patent application No. 11801257.4 dated Sep. 25, 2013 (9 pages).

* cited by examiner

US 8,974,943 B2

POWER BATTERY PACK COOLING APPARATUS

FIELD OF THE INVENTION

The present invention relates to a power battery pack cooling apparatus.

BACKGROUND OF THE INVENTION

The supply of fossil fuels is slowly being exhausted, and burning gasoline is causing much environmental pollution. Electric vehicles (EVs) are the future of transportation, but their batteries have some critical shortcomings: short range of vehicles, short service life, and high costs, preventing widespread consumer adoption. Regulating the battery temperature during continuous charge and discharge is a major challenge.

For most Li-ion batteries used in EVs, their temperature specification is normally as follows:

Operating temperature: −20° C. to 60° C.
Charging temperature: 0° C. to 45° C.
Storage temperature: −10° C. to 45° C.

They can achieve their rated capacity at 20~25° C. and their capacity will drop ~10% for every increase of 10° C.

During winter, when temperatures can easily fall below 0° C., it will be difficult or totally impossible for charging.

During other seasons, under continuous high current charge/discharge, the battery working temperature can easily reach 60° C., making it difficult for discharging. Higher temperatures can also cause battery degradation, shortened service life, or present safety hazards.

The specific characteristics of Li-ion cells require well-adapted and well-designed battery temperature management and control systems.

In the subsequent paragraphs, for simplification, the word 'cooling' will represent heat exchange, be it cooling or heating, and the word 'coolant' will represent a liquid that has anti-freeze, non-flammable, non-corrosive and anti-fungal properties for heat exchange of the battery cells, be it for cooling or heating.

DESCRIPTION OF RELATED PRIOR ART

Present-day battery packs are constructed by connecting a number of battery modules, each module consisting of several cells connected side by side. The result is that cells in the center of each module are more thermal insulated, resulting in more difficult heat exchange.

Existing battery cooling solutions normally consist of the battery modules sitting on or attached to a heat sink (a flat metal plate) that is cooled by a coolant loop. The drawbacks are that the cooling efficiency is low, and the effectiveness is poor, since only a small part of each module receives the cooling effect. Also, the heat sinks are generally thick and heavy due to the coolant loop. The result is that temperatures will differ from module to module, cell to cell. Even within the same cell, different regions may have different temperatures. If heat sinks were to be used to cool each cell, it would result in a battery pack with impractical weight and volume.

Consistency and uniformity of each cell in a battery pack is very important for its durability and effectiveness. Once the cells are produced and assembled into battery packs, the only factor that is able to affect its consistency and uniformity is the temperature of each cell. Temperature changes can affect the cells' internal resistance, and changes to internal resistance can in turn affect the rate of temperature change. The existence of a temperature gradient between cells will cause different rates of cell ageing, resulting in certain cells having shorter lifespans. With the failure of a single cell, the operation of the entire battery pack is compromised as all cells are interlinked to work together.

Battery packs used in EVs are constrained by space and weight, so cooling systems for the battery packs must be compact and lightweight, yet meeting the power and energy capacity requirements.

In Kouzu et al (U.S. Pat. No. 6,211,646) a battery pack cooling apparatus is described comprising a cooling grid array with a plurality of cooling ducts (cooling fin plates 21, 21, 21) in between end plates 23, 23 with attached rubber sheets 22.

Both Kimoto et al (US Pub 2002/0187390) and Yagi et al (US Pub 2005/0153199) describe a cooling apparatus for battery pack which includes different size and shape apertures in the different components of the battery pack for directing cooling air through a battery pack.

SUMMARY OF THE INVENTION

Based on the above observations, I studied and worked out a unique battery pack cooling apparatus suitable for EV requirements. Although the design below is intended for applications in an EV and is a proof-of-concept for realistic application in an EV, it does not and will not limit or affect the claims about its novel concept, principles, and structure for other applications.

DETAILED DESCRIPTION OF THE INVENTION

For the battery cell type and cell specifications, I have selected laminated cells. Compared to cylindrical cells, laminated cells have lower internal resistance and therefore lower heat generation upon charging and discharging. Also, it has a higher energy/power density. Because of its flat geometry and higher exposed surface area, it is easier for heat exchange to take place.

Figure 1:
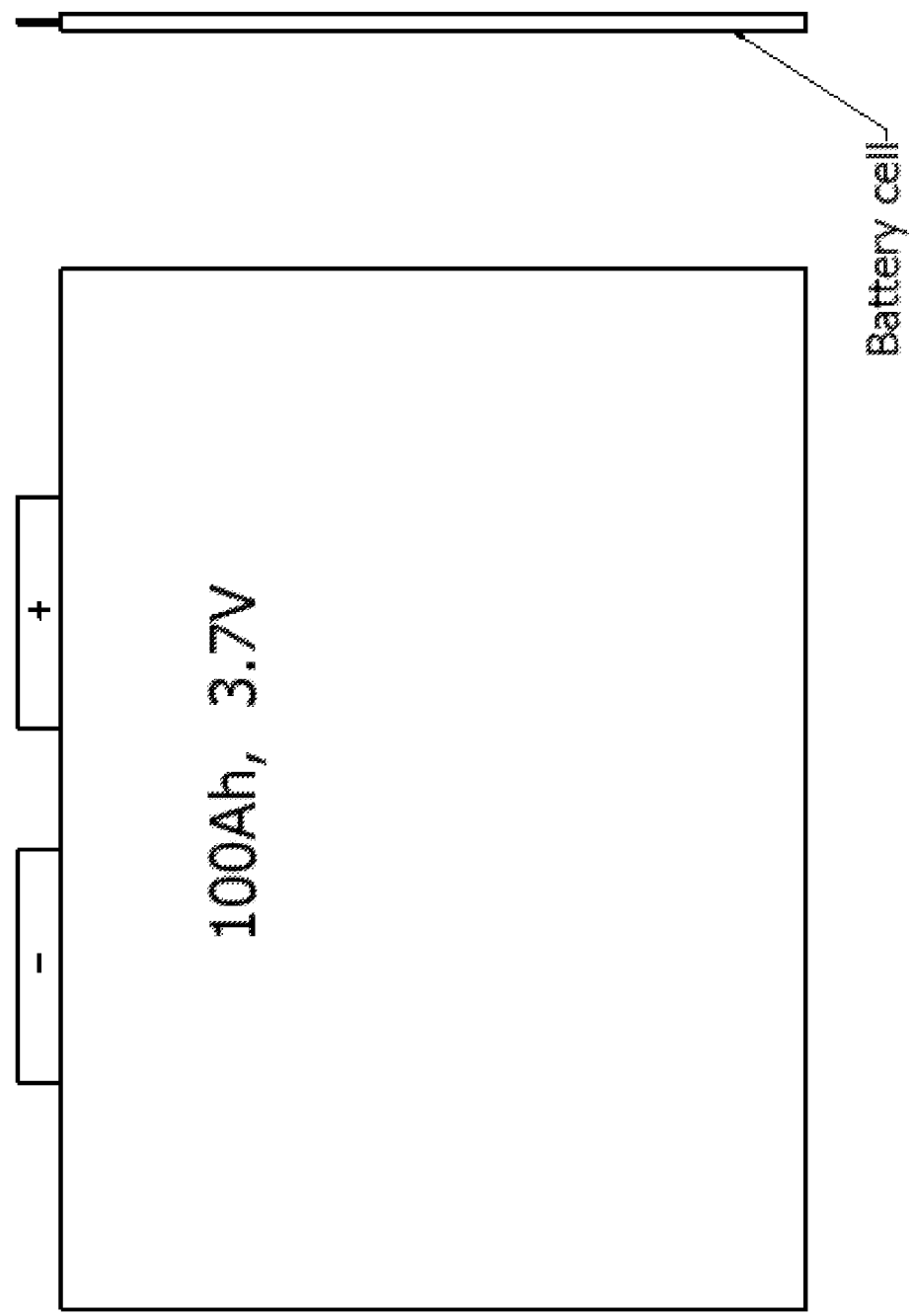
FIG. 1 is a large-format laminated battery cell (100 Ah, 3.7V)

I have designed the battery pack to have 86 pieces of large-format laminated cells (100 Ah, 3.7V, as shown in FIG. 1). The battery cells are connected by means of a novel clip system, outlined below, which provides for electrical connectivity under space constraints.

Figure 2:
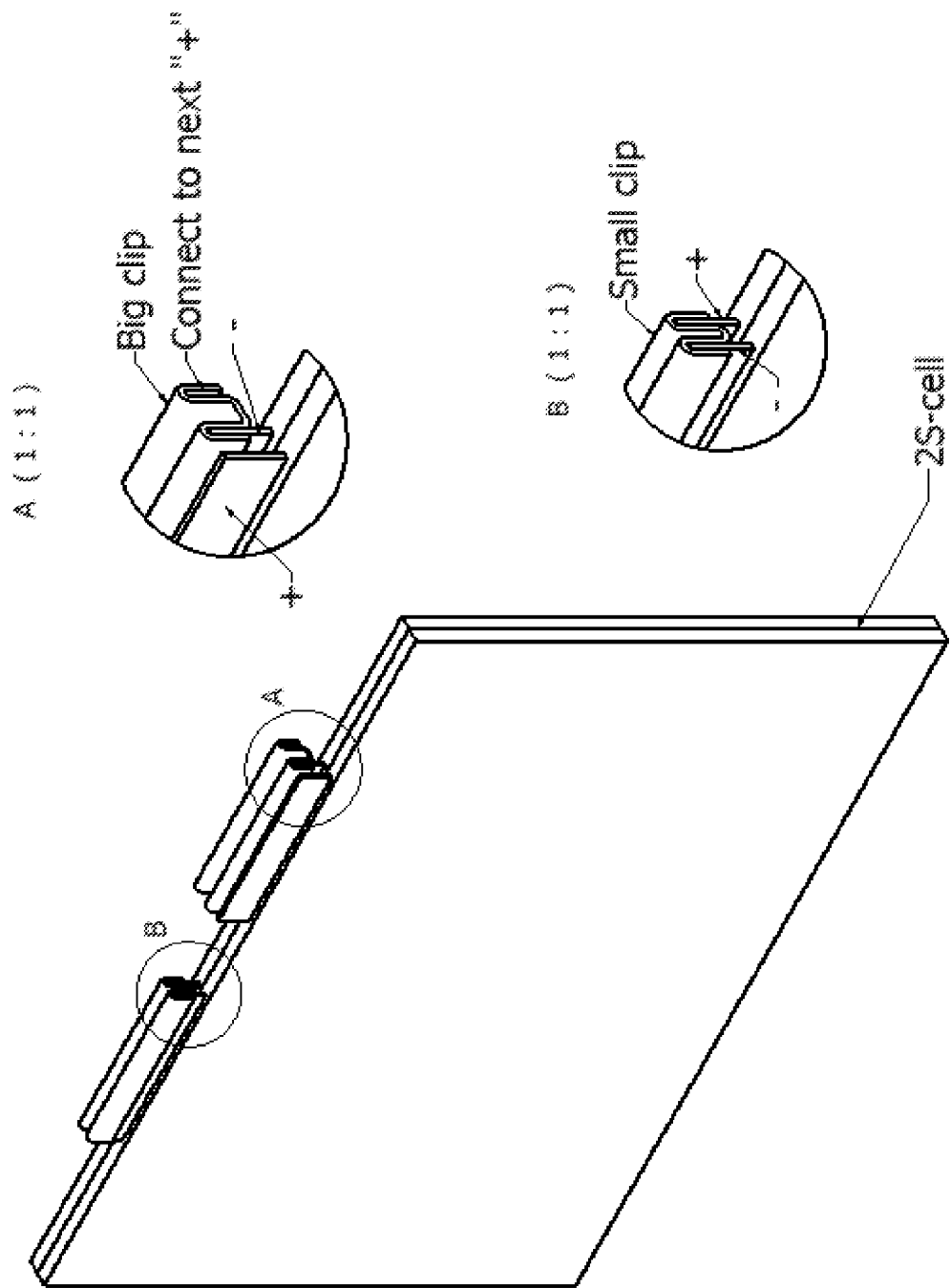
FIG. 2 is a 2S-cell (2 battery cells connected in series)
Figure 3:
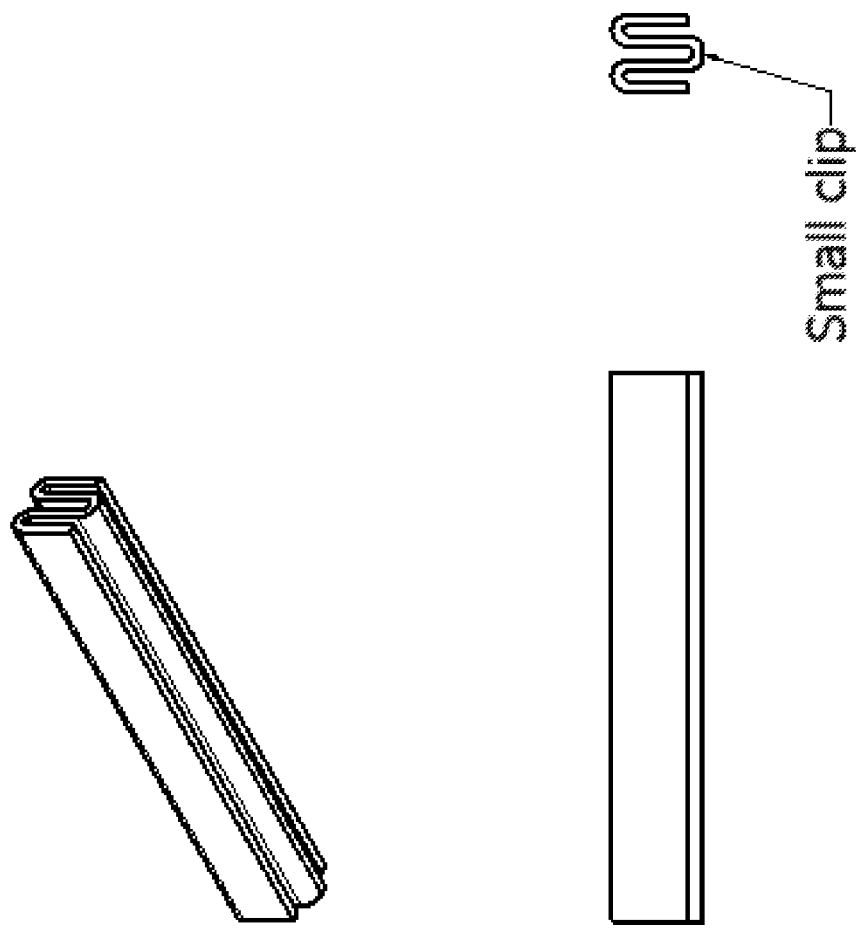
FIG. 3 is a small clip.
Figure 18:
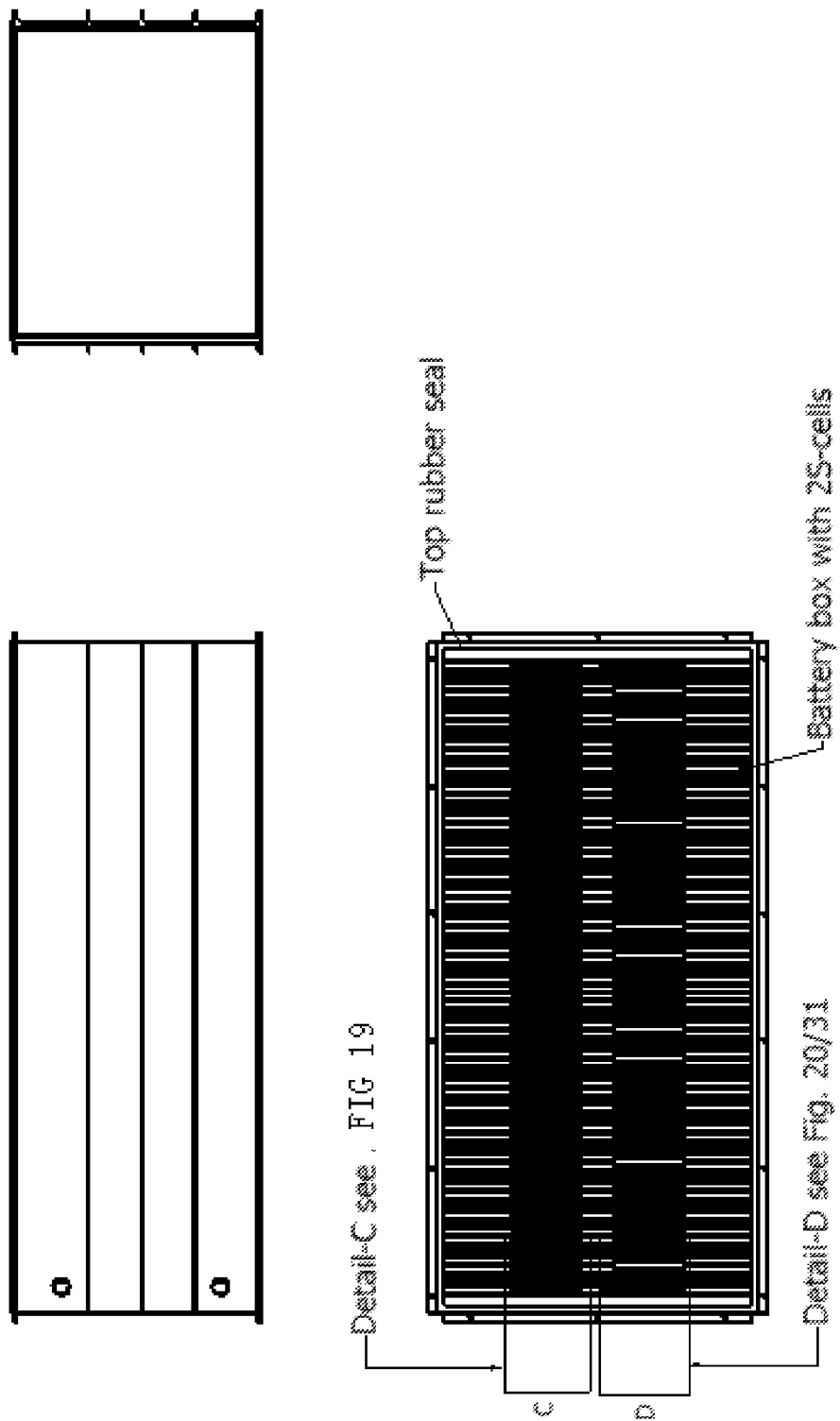
FIG. 18 is a battery box with multiple 2S-cells.
Figure 19:
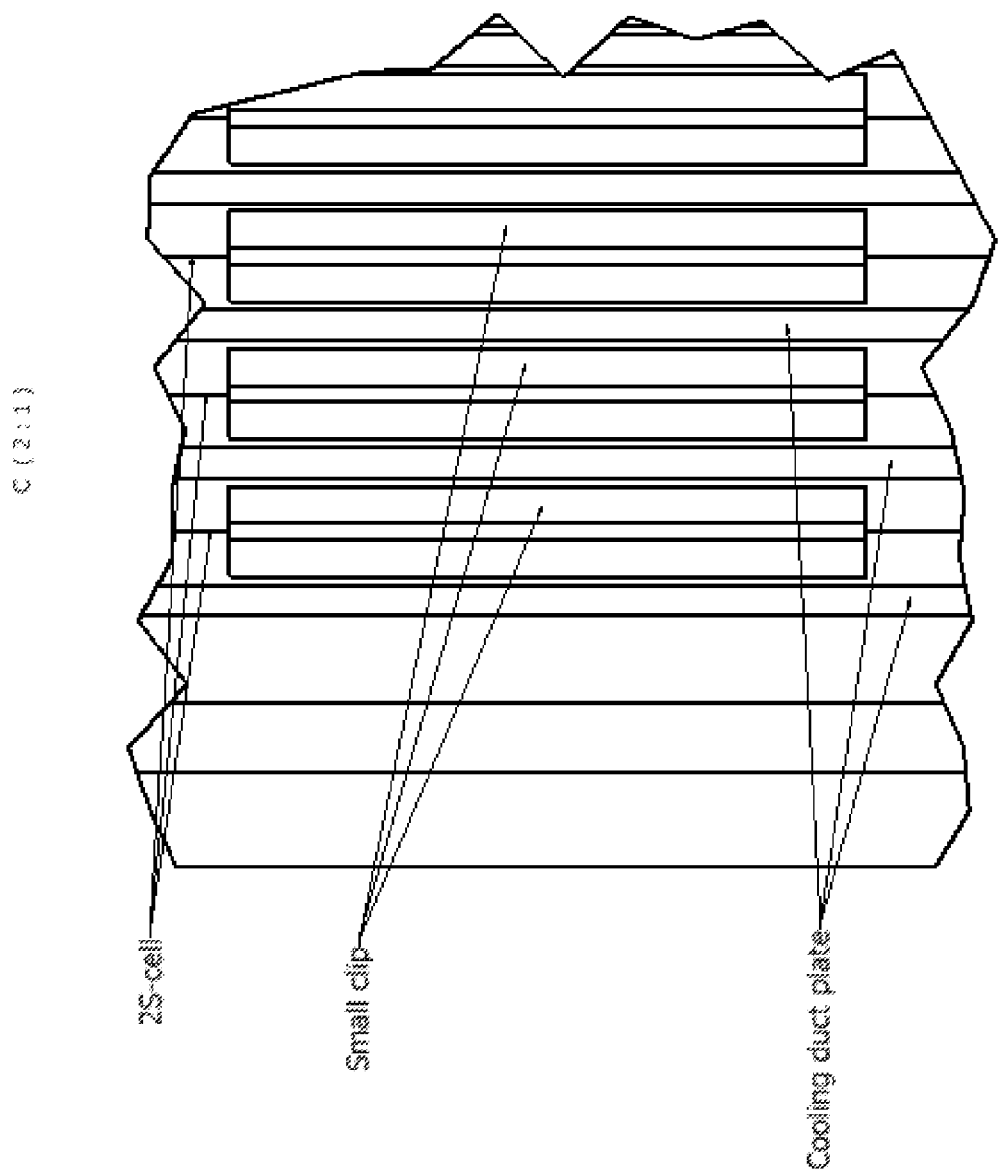
FIG. 19 is a detail view-C of FIG. 18.

Two cells are connected face-to-face in series (FIG. 2), with one of the terminals connected to the opposite terminal of the other cell, by a small clip (FIG. 3). This will be one 2S-cell. Both sides of the 2S-cell will be in contact with the cooling duct plate (FIG. 18) for heat exchange.

Figure 4:
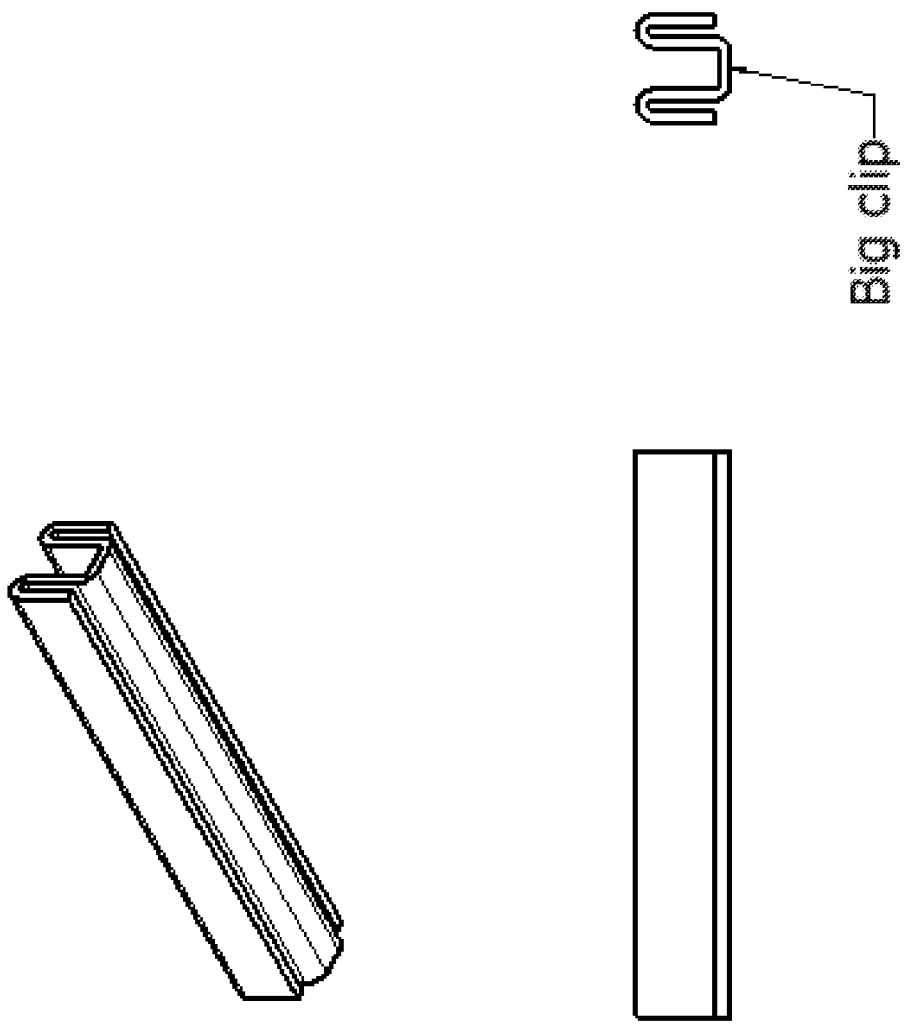
FIG. 4 is a big clip.

2S-cells are connected in series, with the terminals of each 2S-cell in identical orientation. A big clip (FIG. 4) connects the terminals between each 2S-cell, straddling the cooling duct plate (detail-D of FIG. 18), which is between the two 2S-cells once they are inserted into place.

Figure 5:
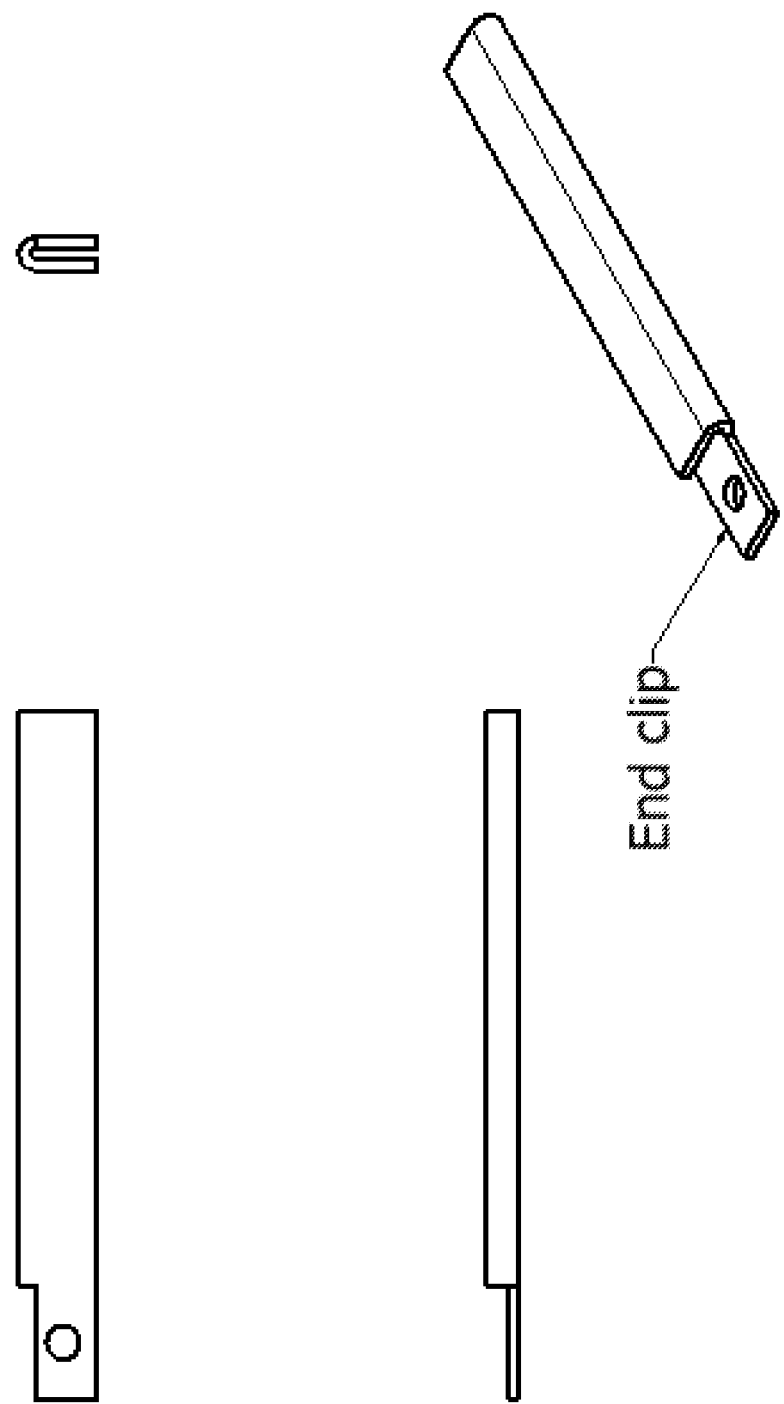
FIG. 5 is an end clip.
Figure 20:
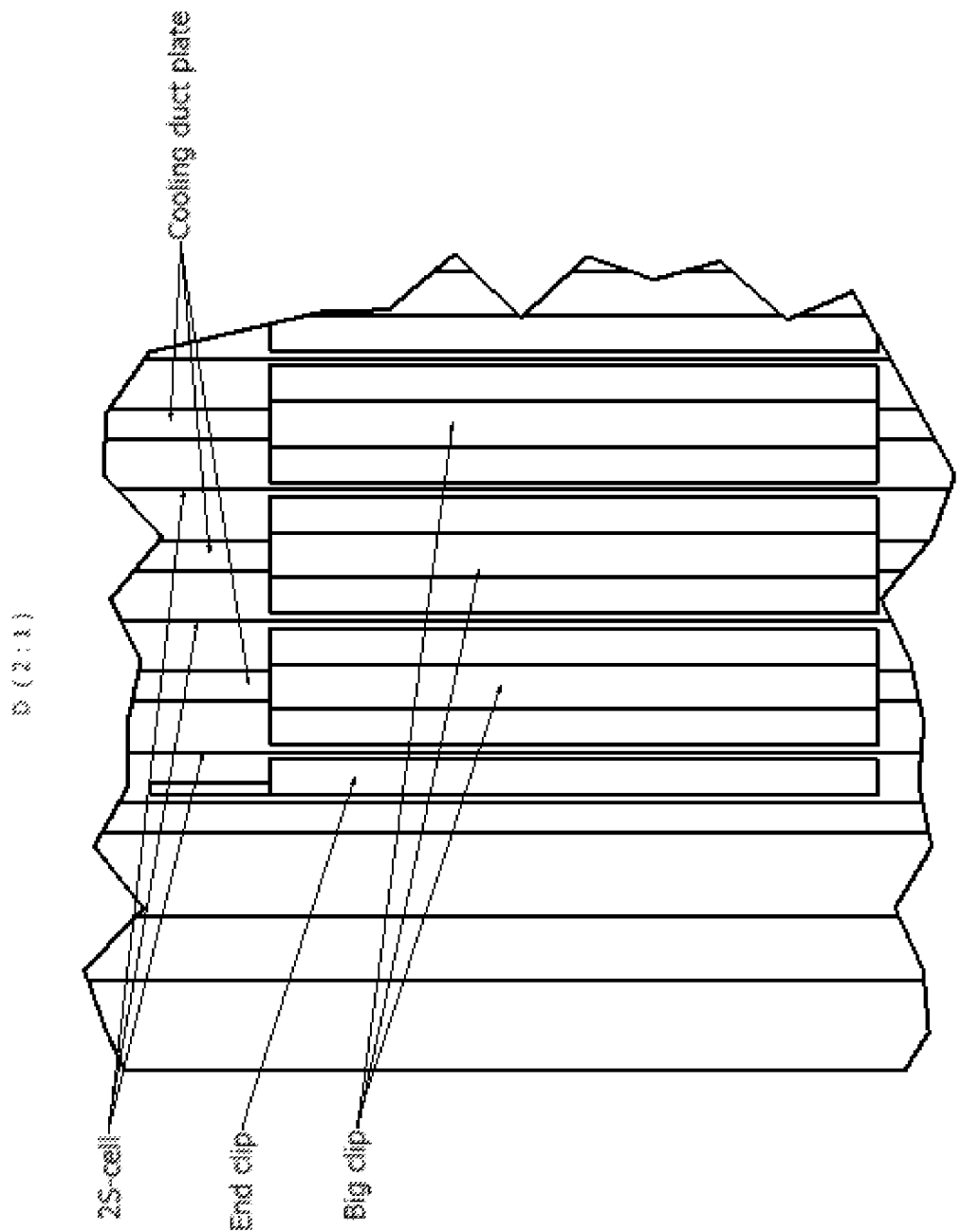
FIG. 20 is a detail view-D of FIG. 18.

End clips (FIG. 5) are used at the positive terminal of the first cell of the first 2S-cell (FIG. 20), and the negative terminal of the last cell of the last 2S-cell, for connection to main power cables. All clips are made of metallic materials with electrical conductivity.

This will achieve the voltage (320V) and energy capacity (32 kWh) for purely electric driving for a range of 120~150 km (the range of 90% of daily urban commuters).

To lower the cost of the battery pack box, extruded aluminum alloy construction will be used for the box construction plates wherever possible.

Figure 6:
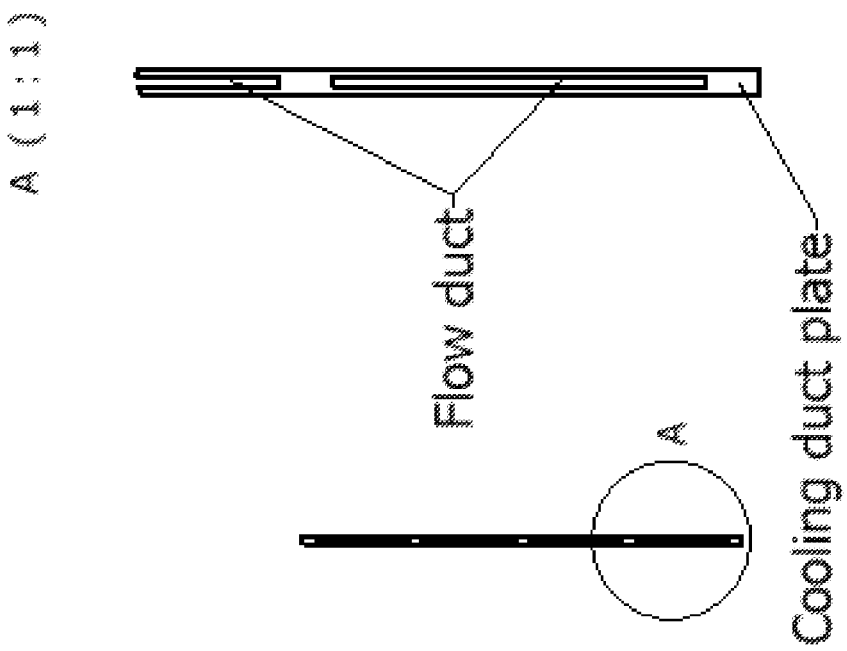
FIG. 6 is a cooling duct plate.
Figure 6:
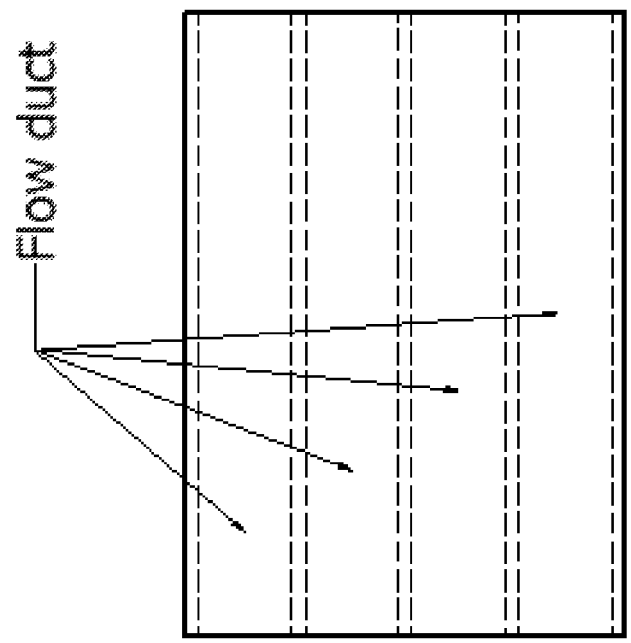

FIG. 6 depicts the cooling duct plate. The divided hollow flow ducts are for the coolant to pass through and for heat exchange to take place with the 2S-cells.

Figure 7:
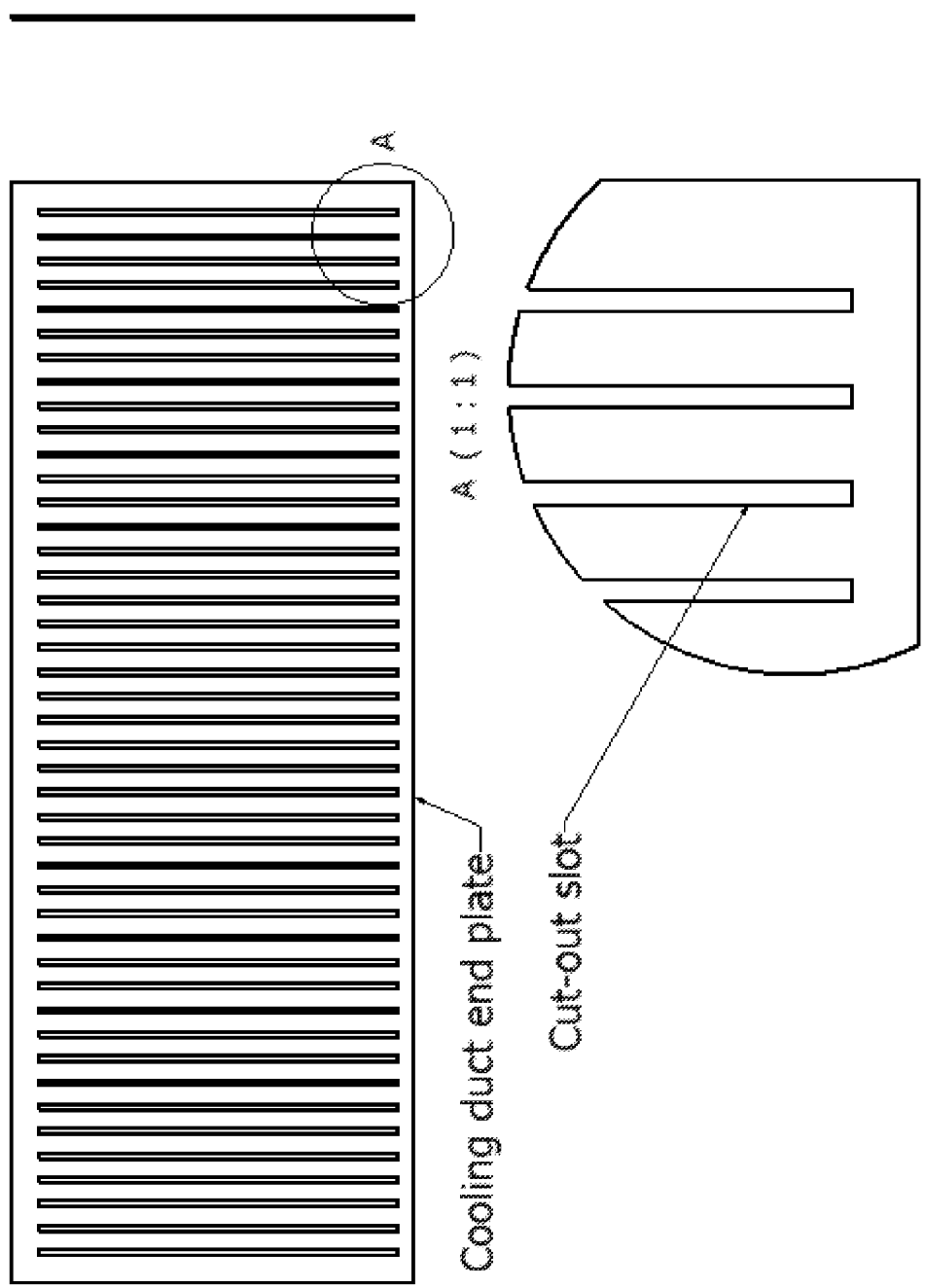
FIG. 7 is a cooling duct end plate.
Figure 8:
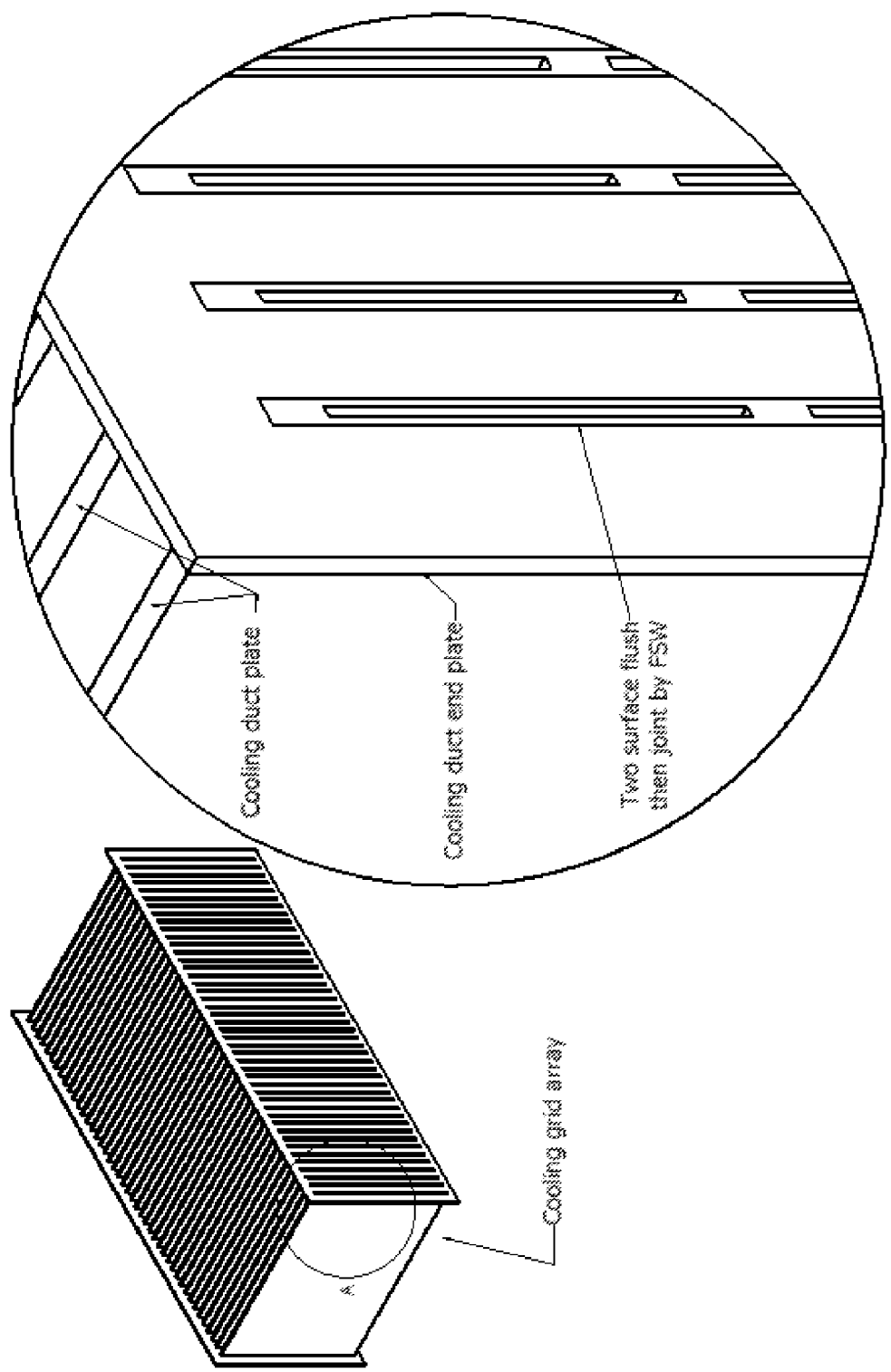
FIG. 8 is the cooling grid array.

Both ends of the cooling duct plates are inserted into the cooling duct end plates cut-out slot (FIG. 7), resulting in a flushed outside surface. Friction Stir Weld (FSW) will be used to make a leak-proof joint, forming a homogenous and regular structure—the cooling grid array, depicted in FIG. 8, consisting of multiple cooling duct plates arranged in a row and attached to cooling duct end plates. The cooling duct plate also supports the battery cell and keeps the battery cell in its position and maintains its shape.

Figure 9:
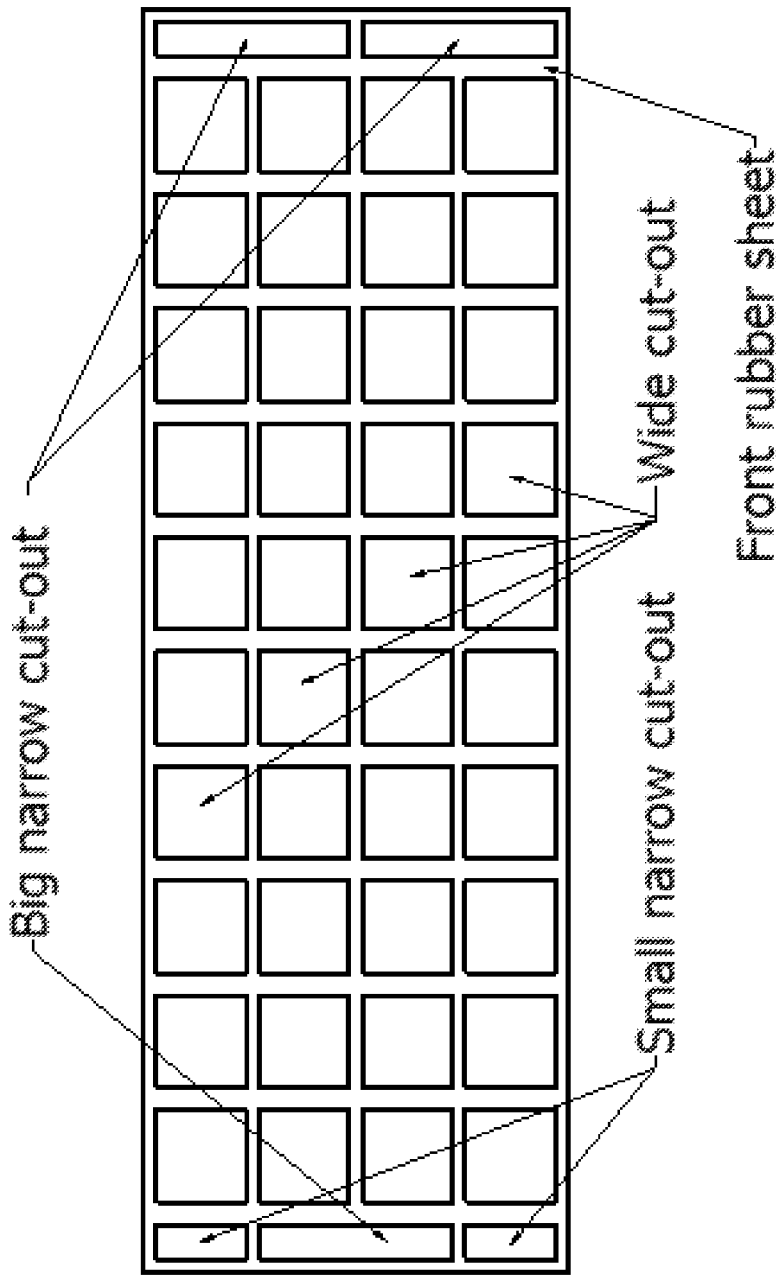
FIG. 9 is a front rubber sheet.
Figure 10:
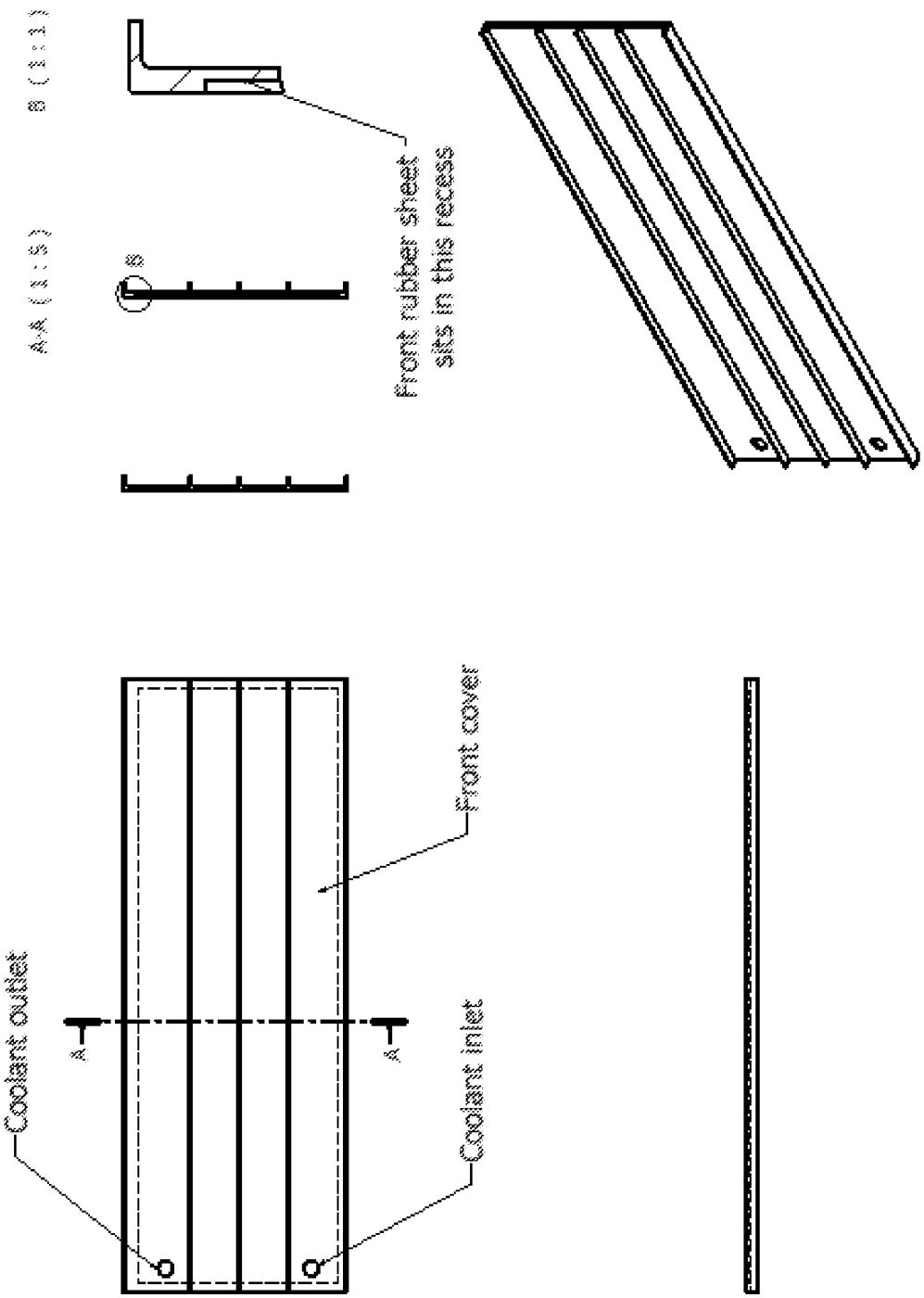
FIG. 10 is a front cover.
Figure 11:
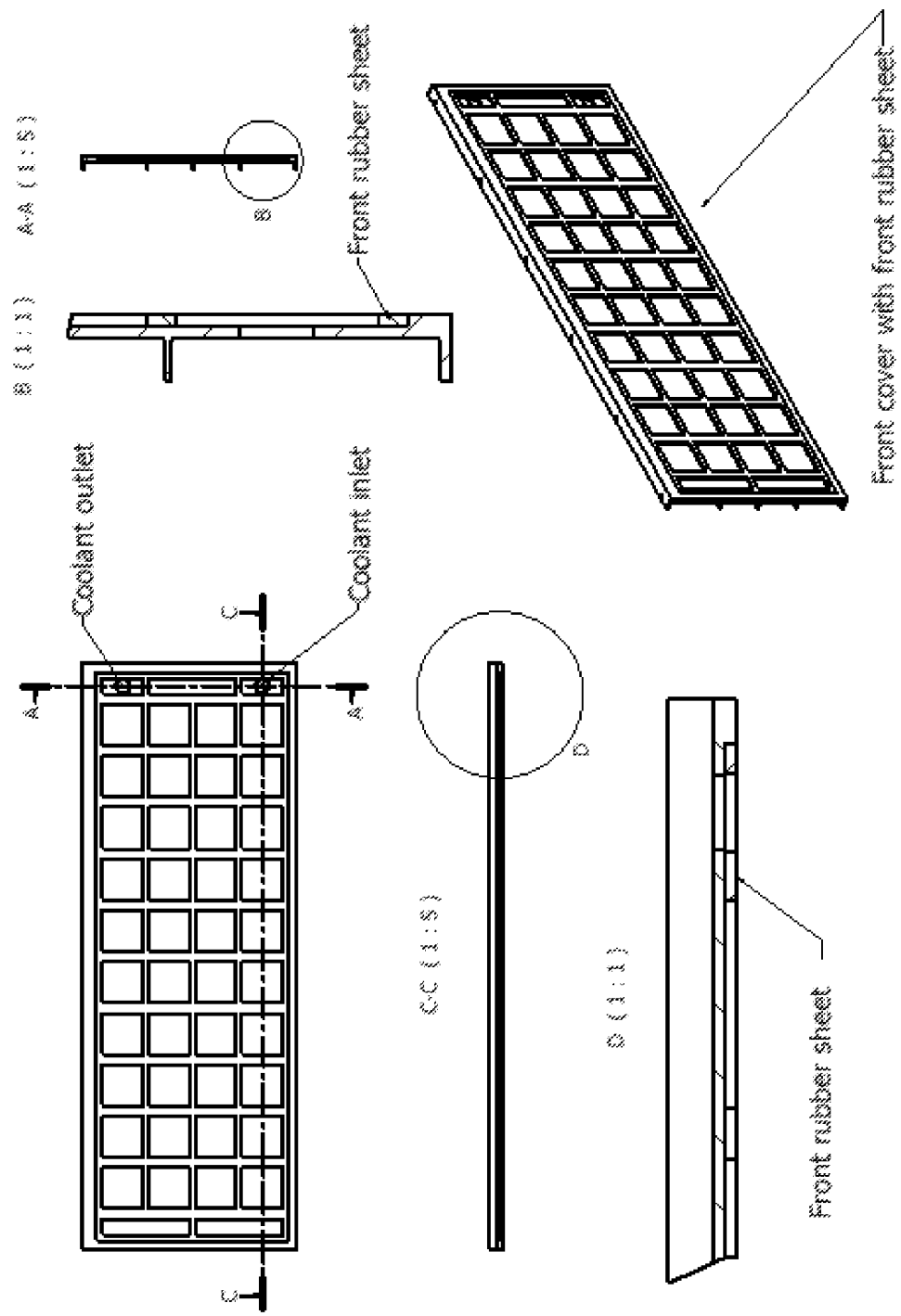
FIG. 11 is a front cover with front rubber sheet.

The front rubber sheet (FIG. 9) will sit in the recess of the front cover (FIG. 10). The final configuration, as viewed from the side where the rubber sheet is, is shown in FIG. 11.

Figure 12:
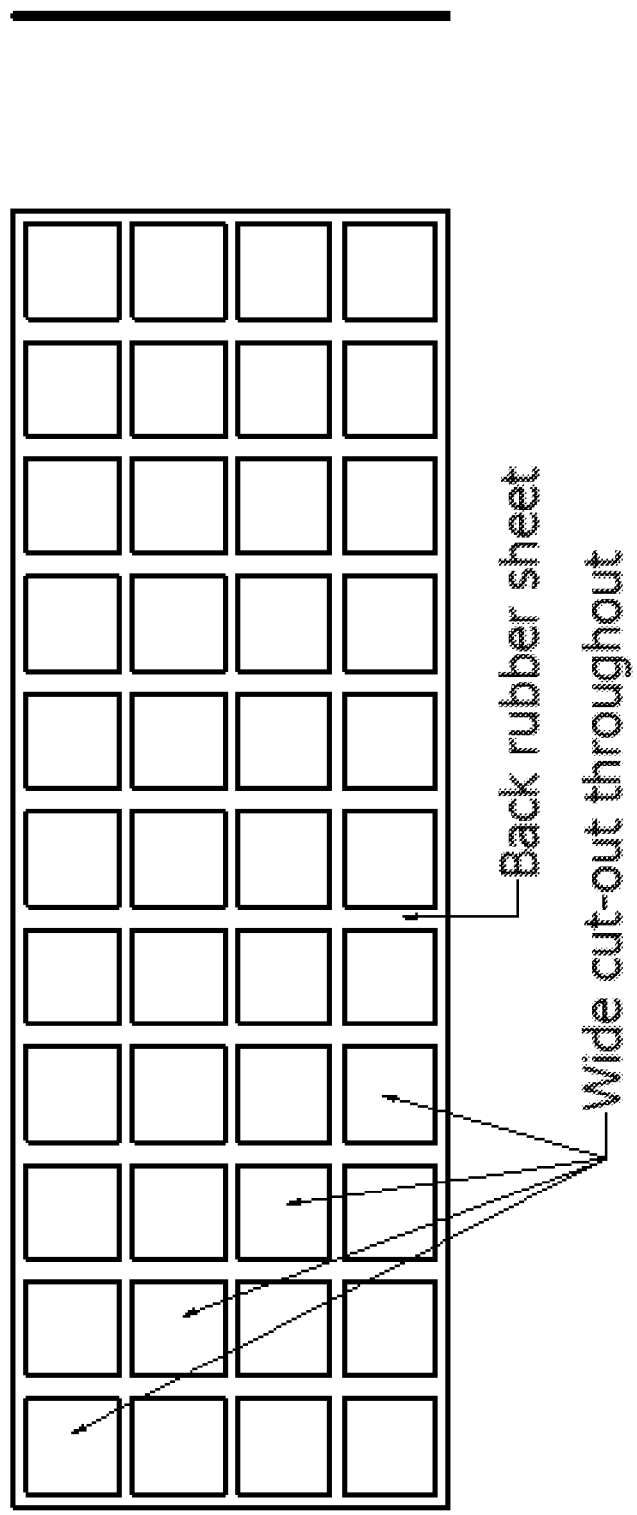
FIG. 12 is a back rubber sheet.
Figure 13:
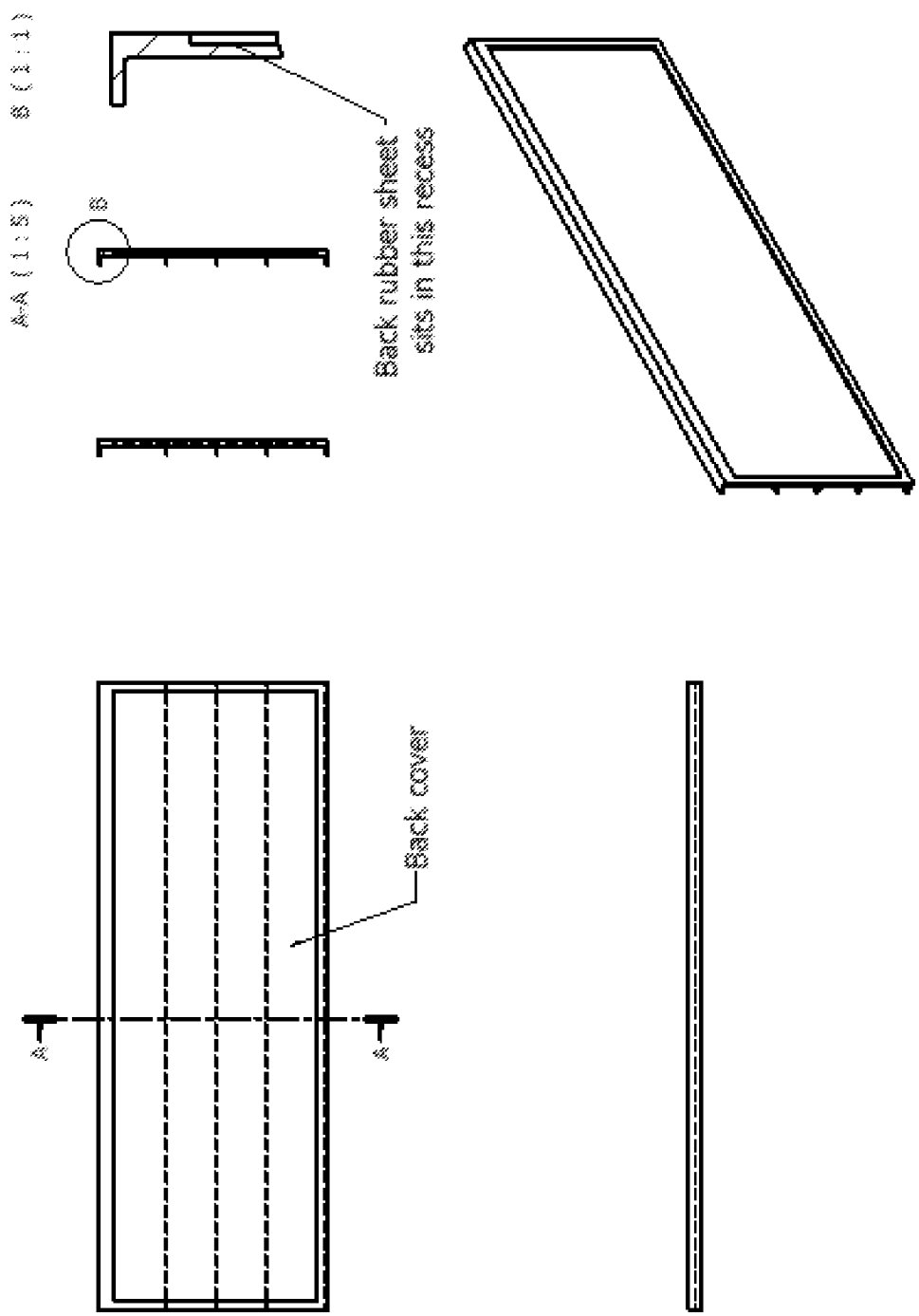
FIG. 13 is a back cover.
Figure 14:
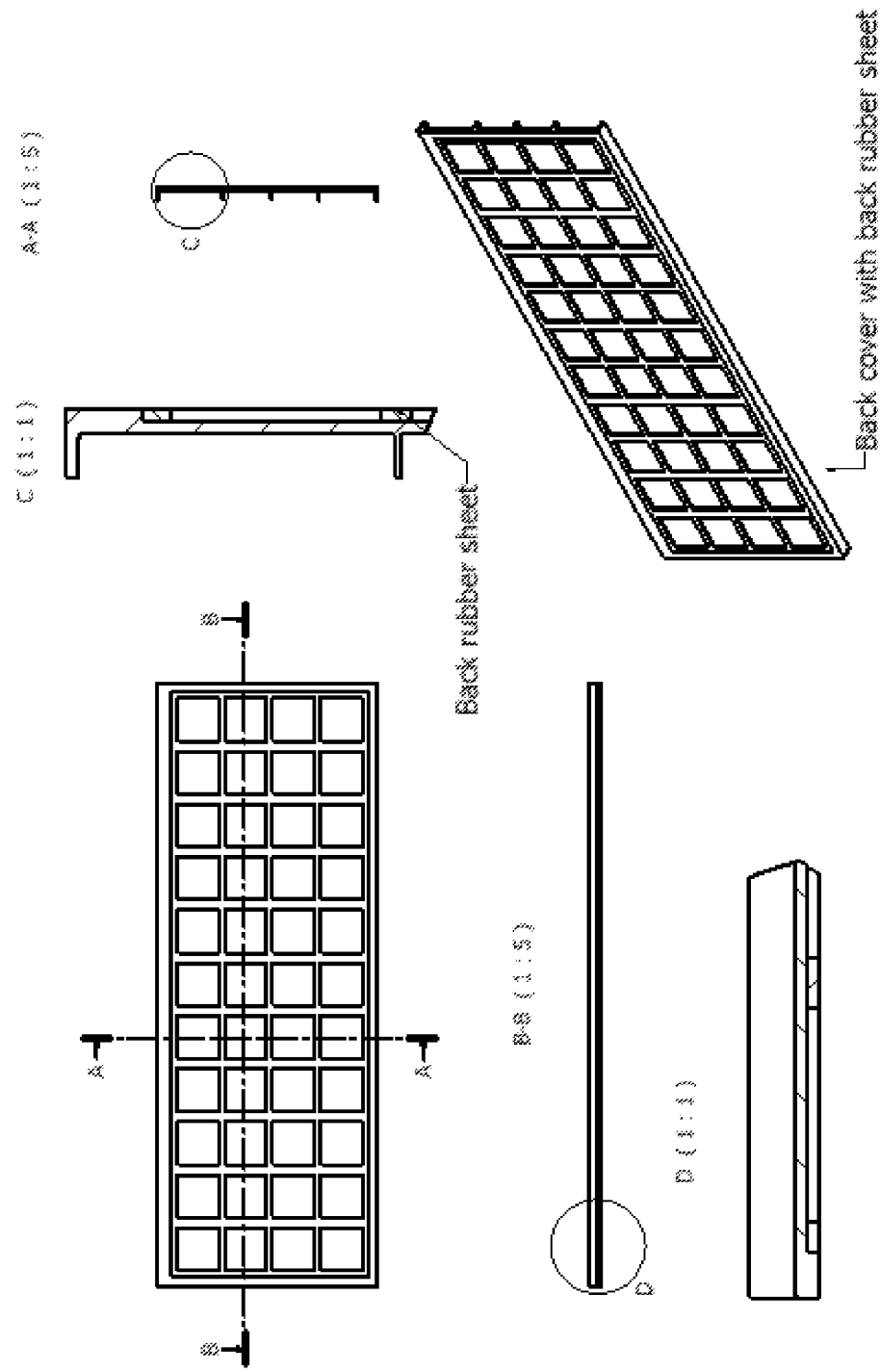
FIG. 14 is a back cover with back rubber sheet.

The back rubber sheet (FIG. 12) will sit in the recess of the back cover (FIG. 13). The final configuration, as viewed from the side where the rubber sheet is, is shown in FIG. 14.

Figure 24:
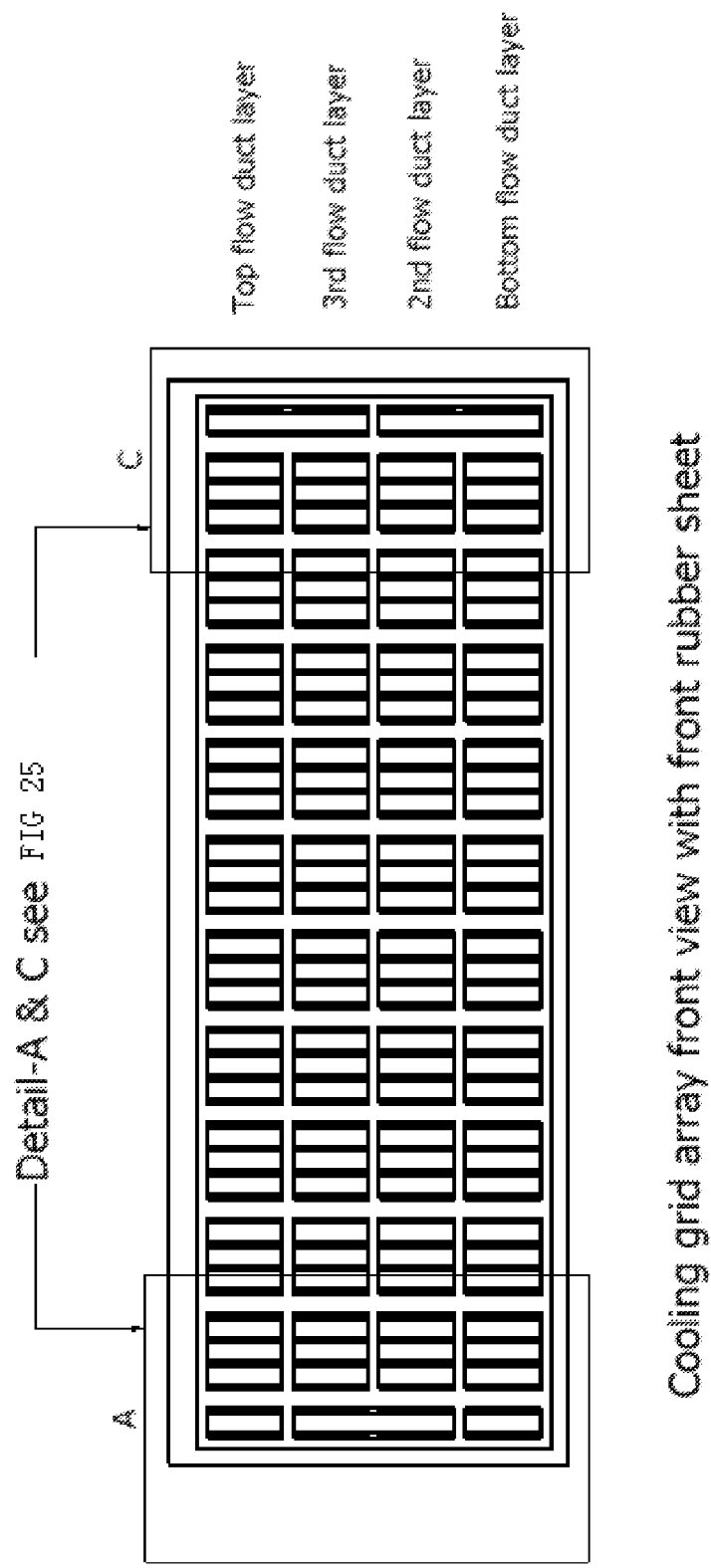
FIG. 24 is cooling grid array front view with front rubber sheet.
Figure 25:
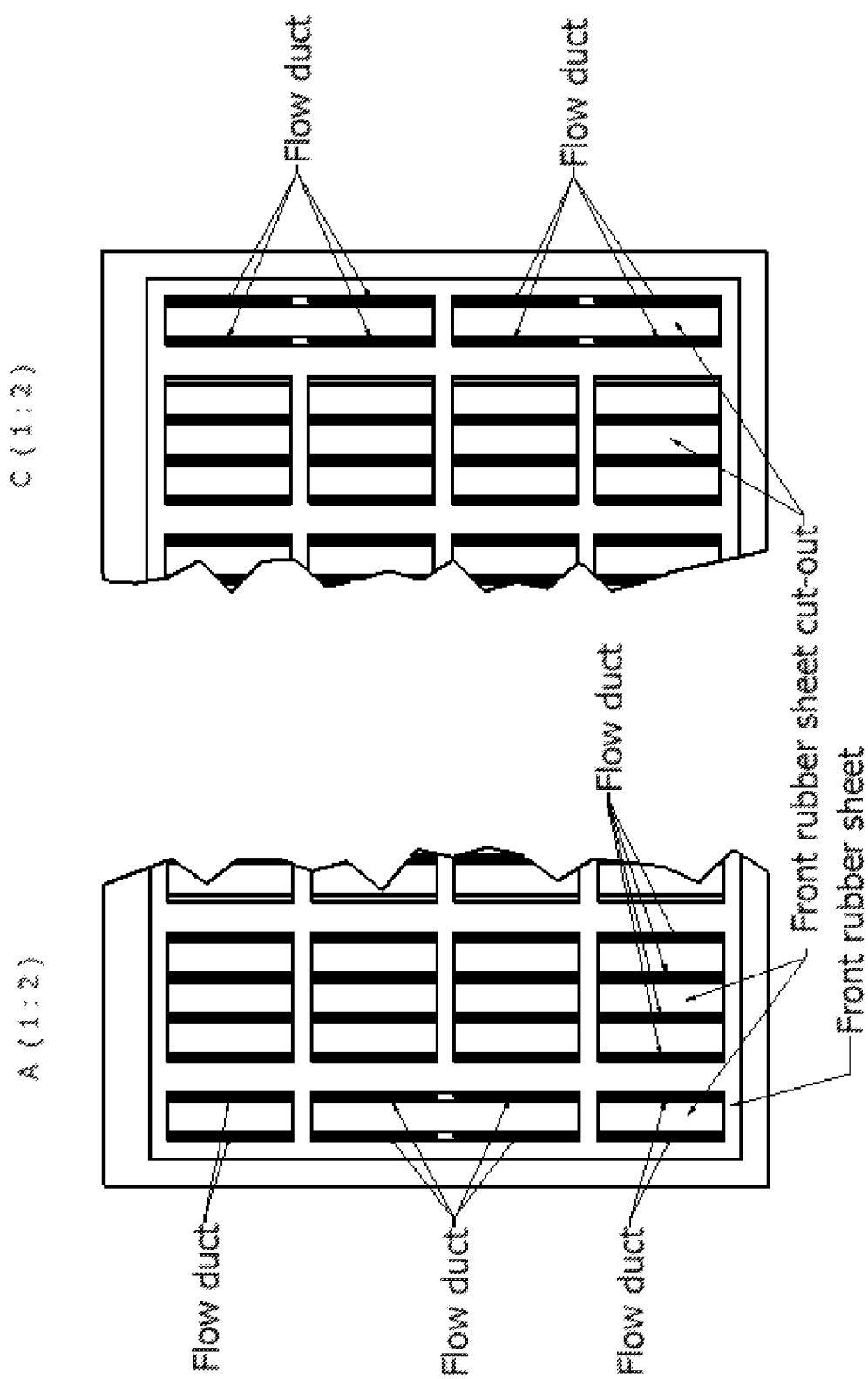
FIG. 25 is a detail view-A & C of FIG. 24.
Figure 26:
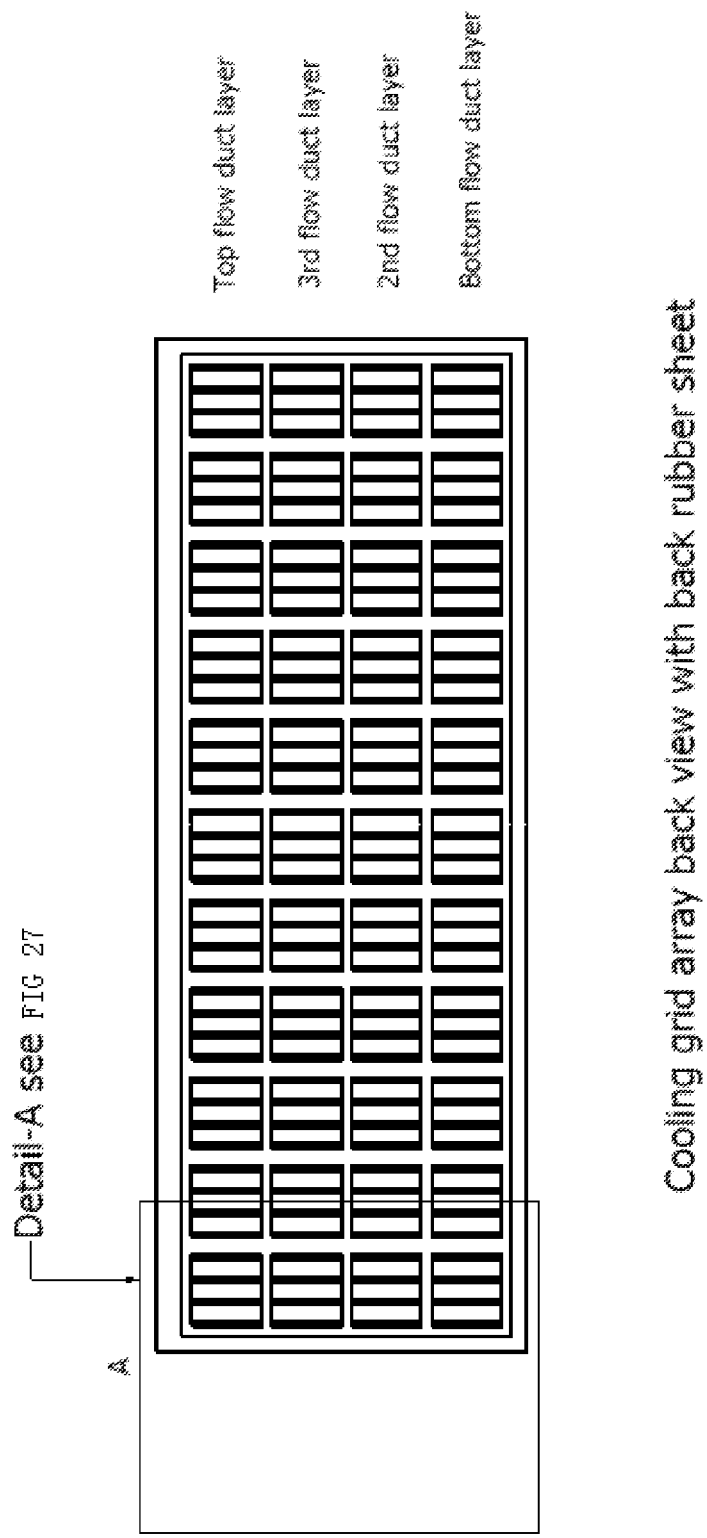
FIG. 26 is cooling grid array back view with back rubber sheet.
Figure 27:
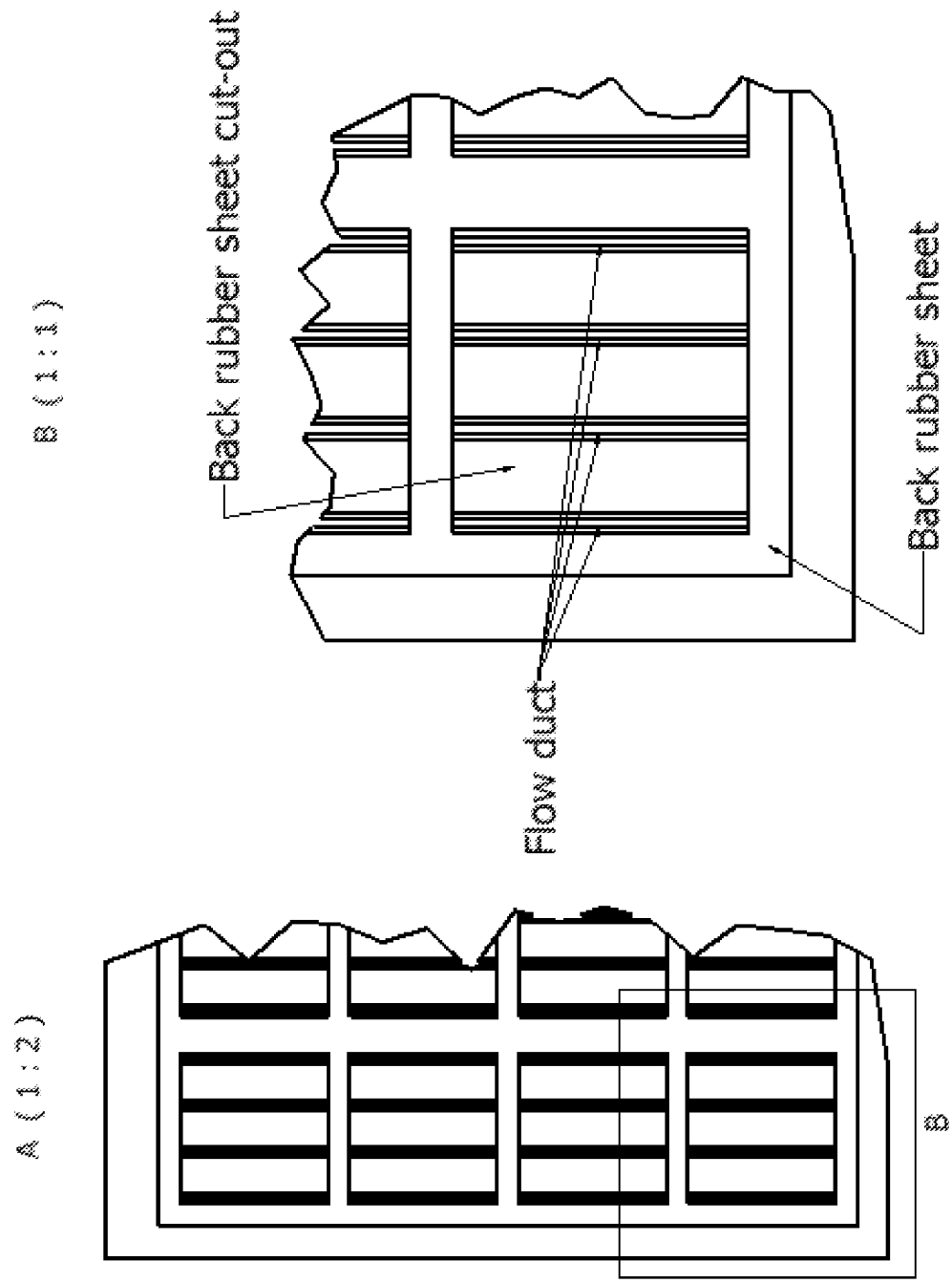
FIG. 27 is a detail view-A of FIG. 26.
Figure 28:
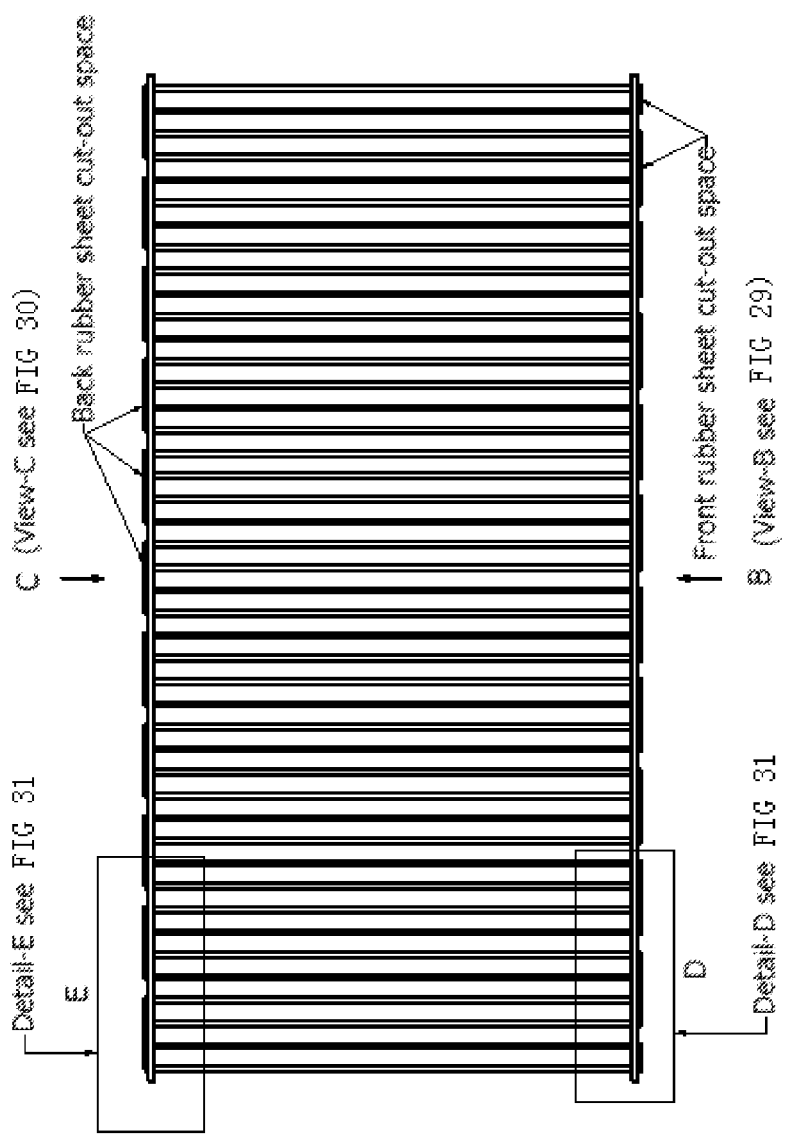
FIG. 28 is cooling grid array top view with front and back rubber sheet cut-out space.

The cut-out patterns of the front and back rubber sheets are slightly different. The front rubber sheet has narrow cut-outs on its left and right (with different layouts for the left and right narrow cut-outs) and wide cut-outs for the rest. The narrow cut-out will open out to two flow ducts laterally (1×2 or 2×2 configuration) while the wide cut-out will open out to four flow ducts (1×4 configuration) (FIG. 24 and FIG. 25). The narrow cut-outs exist in two configurations, namely the large narrow cut-out and the small narrow cut-out (FIG. 25). The large narrow cut-outs can open out to four flow ducts (2×2 configuration), while the small narrow cut-outs can open out to two flow ducts (1×2 configuration). The back rubber sheet has only wide cut-outs throughout (FIG. 26 and FIG. 27). This arrangement of cut-outs will facilitate the directional change of the coolant flow (FIG. 28 to FIG. 31). The rubber sheets also have the function of sealing the space between flow ducts.

The novel structure of the apparatus, having a cooling grid array, a front cover with a front rubber sheet having a special cut-out pattern and a back cover with a back rubber sheet having a special cut-out pattern, is what allows the coolant to flow in a path that results in even and effective cooling throughout the apparatus, at the same time keeping the apparatus compact and lightweight.

Friction Stir Weld (FSW), or any other suitable connection method, can be used for these connections:

Front cover with front cooling duct end plate (must be a leak-proof joint)

Back cover with back cooling duct end plate (must be a leak-proof joint)

Figure 15:
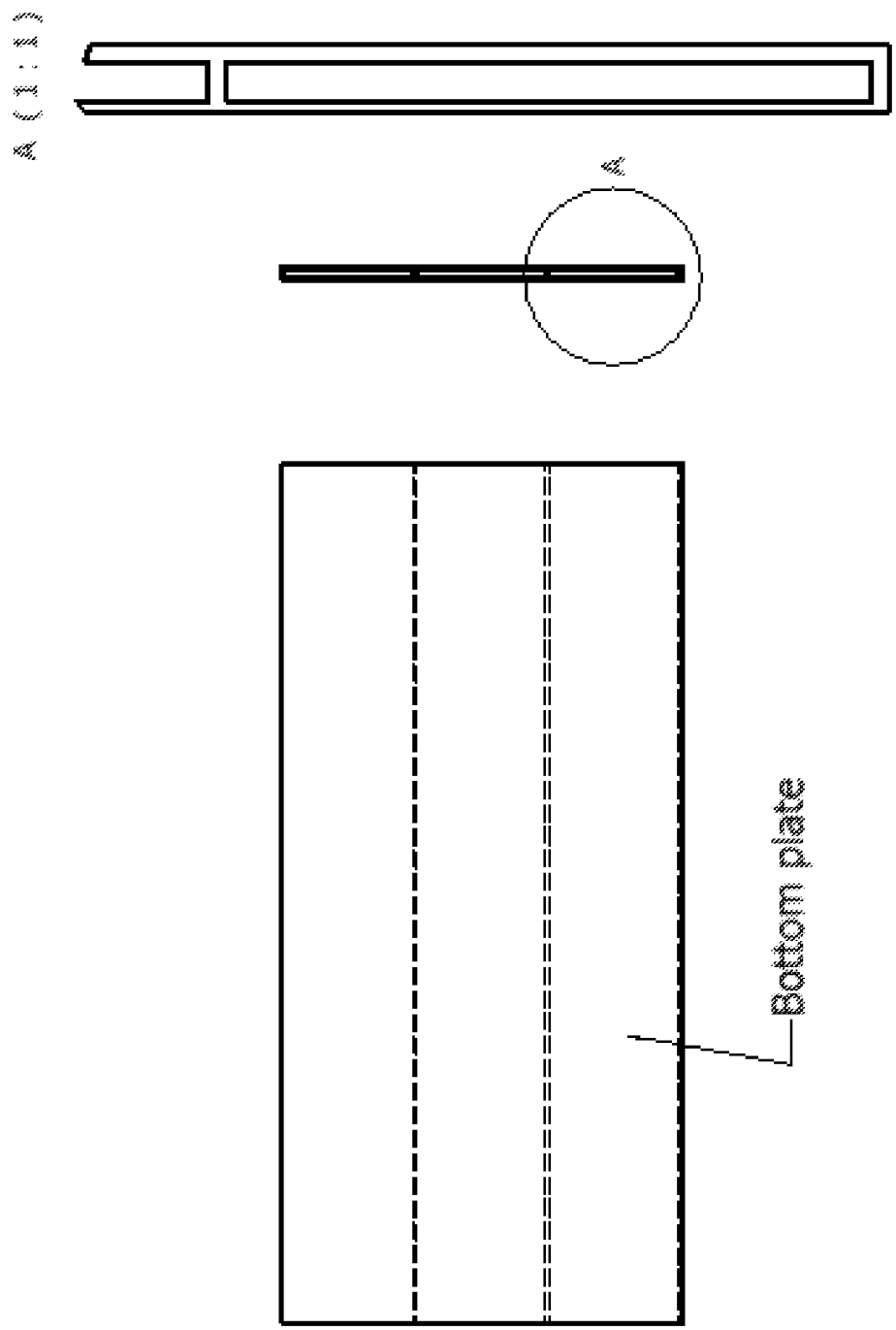
FIG. 15 is a bottom plate.

Bottom plate (FIG. 15) with front & back cooling duct end plate

Figure 16:
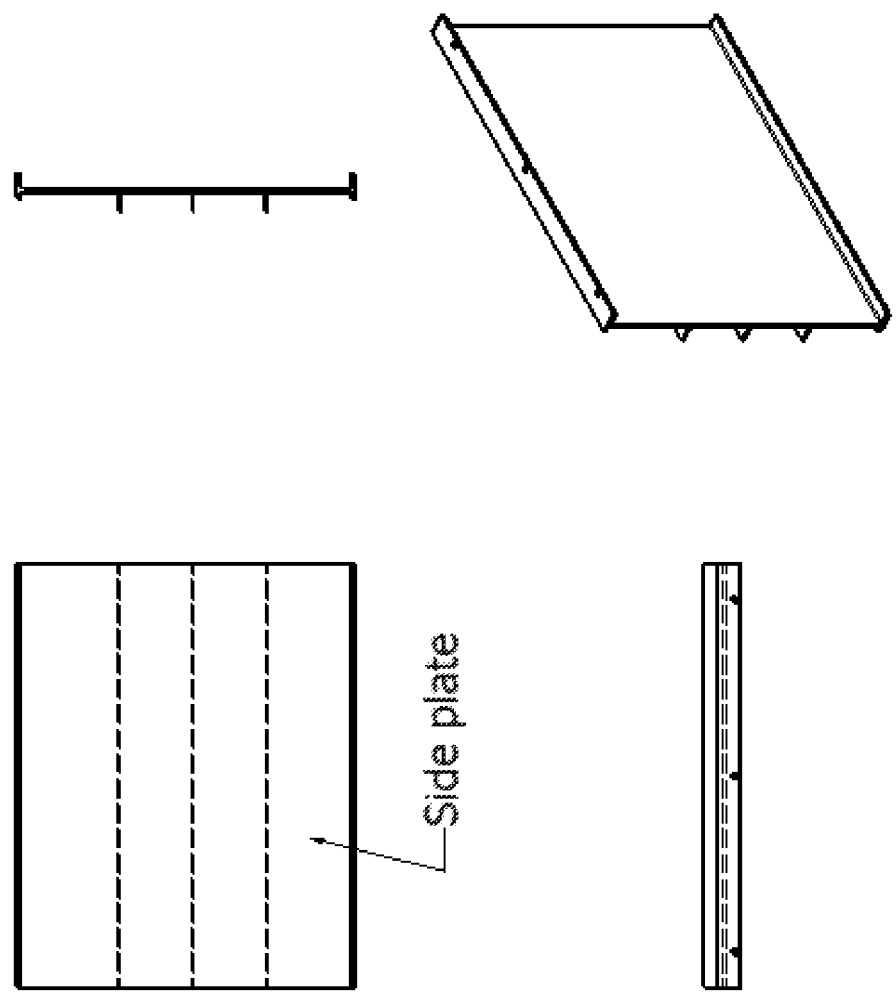
FIG. 16 is a side plate.

Two side plates (FIG. 16) with front & back cooling duct end plate and bottom plate.

Figure 17:
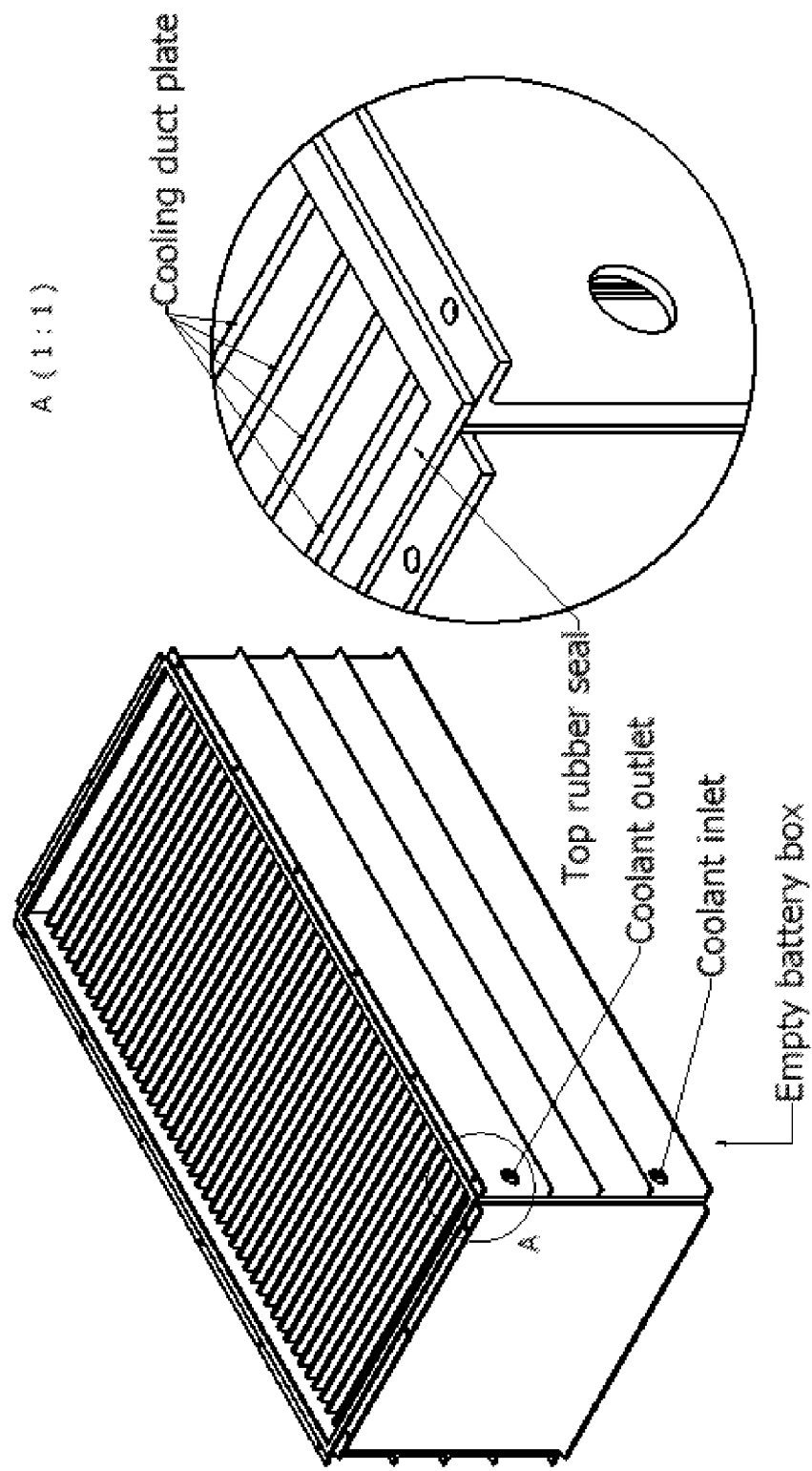
FIG. 17 is an empty battery box.

The construction of the final empty battery box is shown in FIG. 17.

After the 2S-cells have been inserted in the spaces between the cooling duct plates (FIG. 18), with the laying of necessary insulation sheets and spacers and the connection of the small, big and end clips (as described above), battery management system (BMS) connections and cables can be laid.

Figure 21:
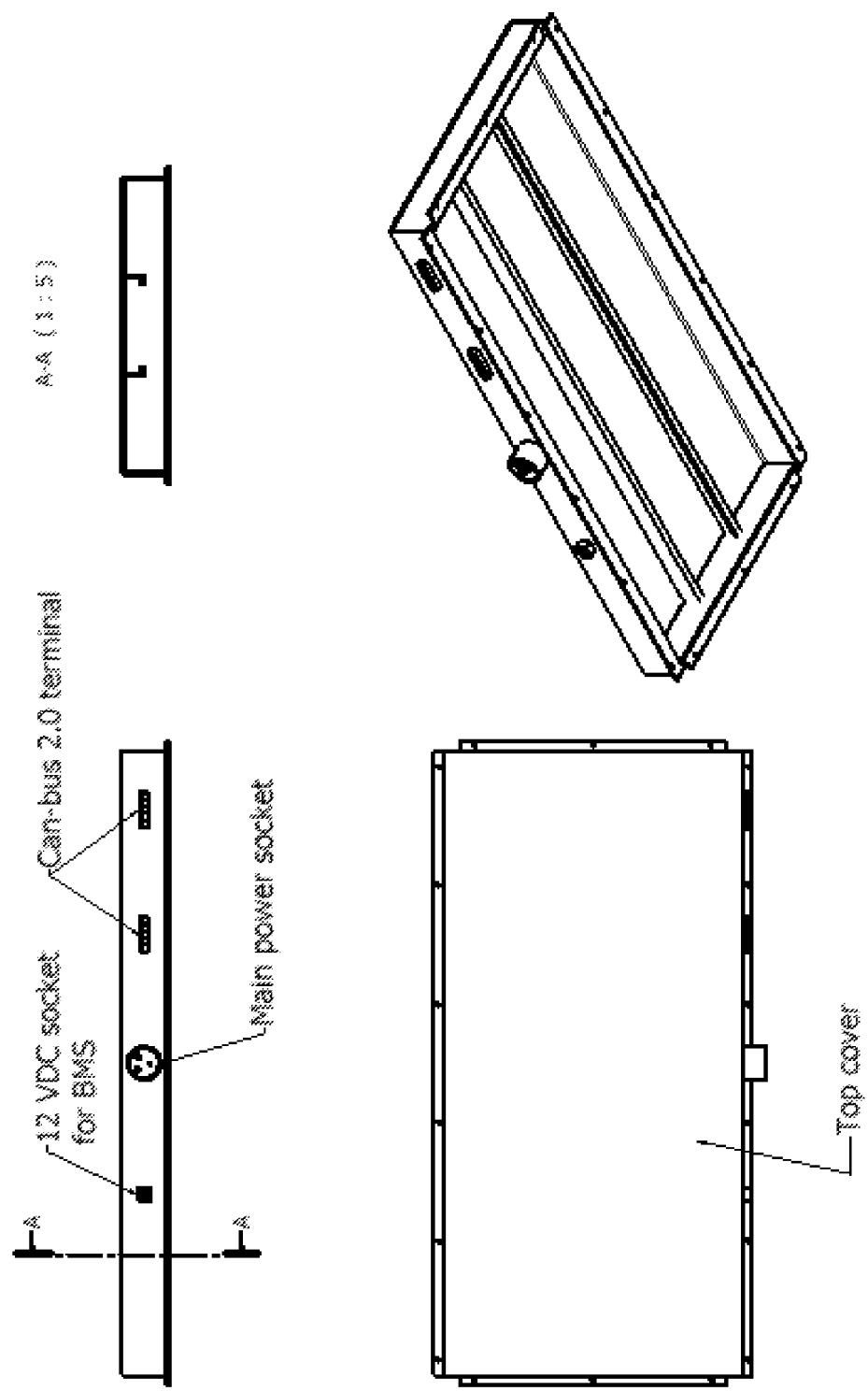
FIG. 21 is a top cover.

The top cover (FIG. 21) has slots that can accommodate a BMS. It is also equipped with various sockets like a 12V DC connection for the BMS, a main power socket and two Canbus 2.0 terminals. It also can be equipped with a quick-release coolant connector at the coolant inlet and outlet. All these make it easy for plug-and-play operation with any EV.

Figure 22:
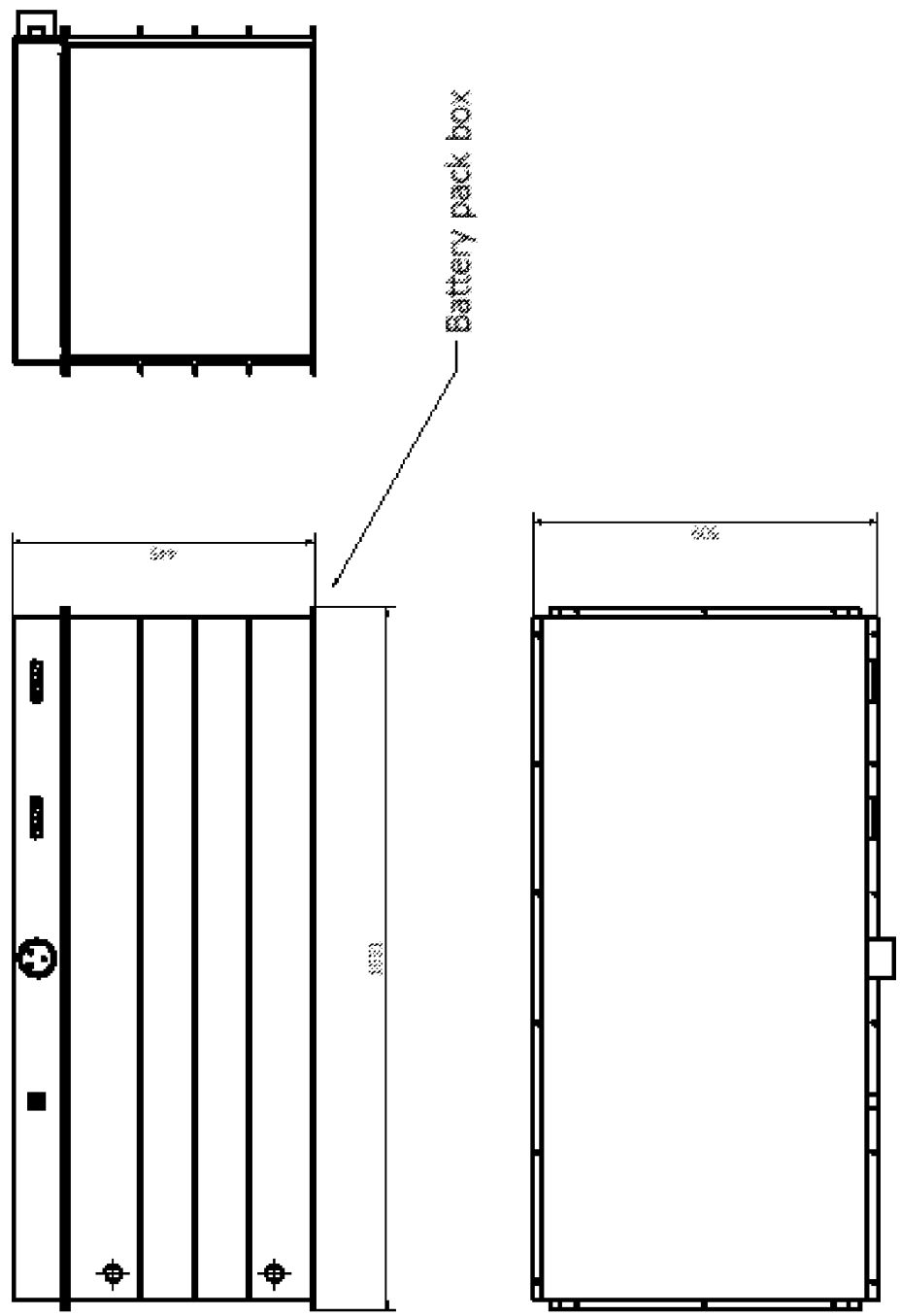
FIG. 22 is a battery pack box.

With a top rubber seal (FIG. 18) between the top cover and the battery box secured by fasteners, the entire battery pack box (FIG. 22) will be an IP65-rated enclosure, suitable for EV application.

Figure 23:
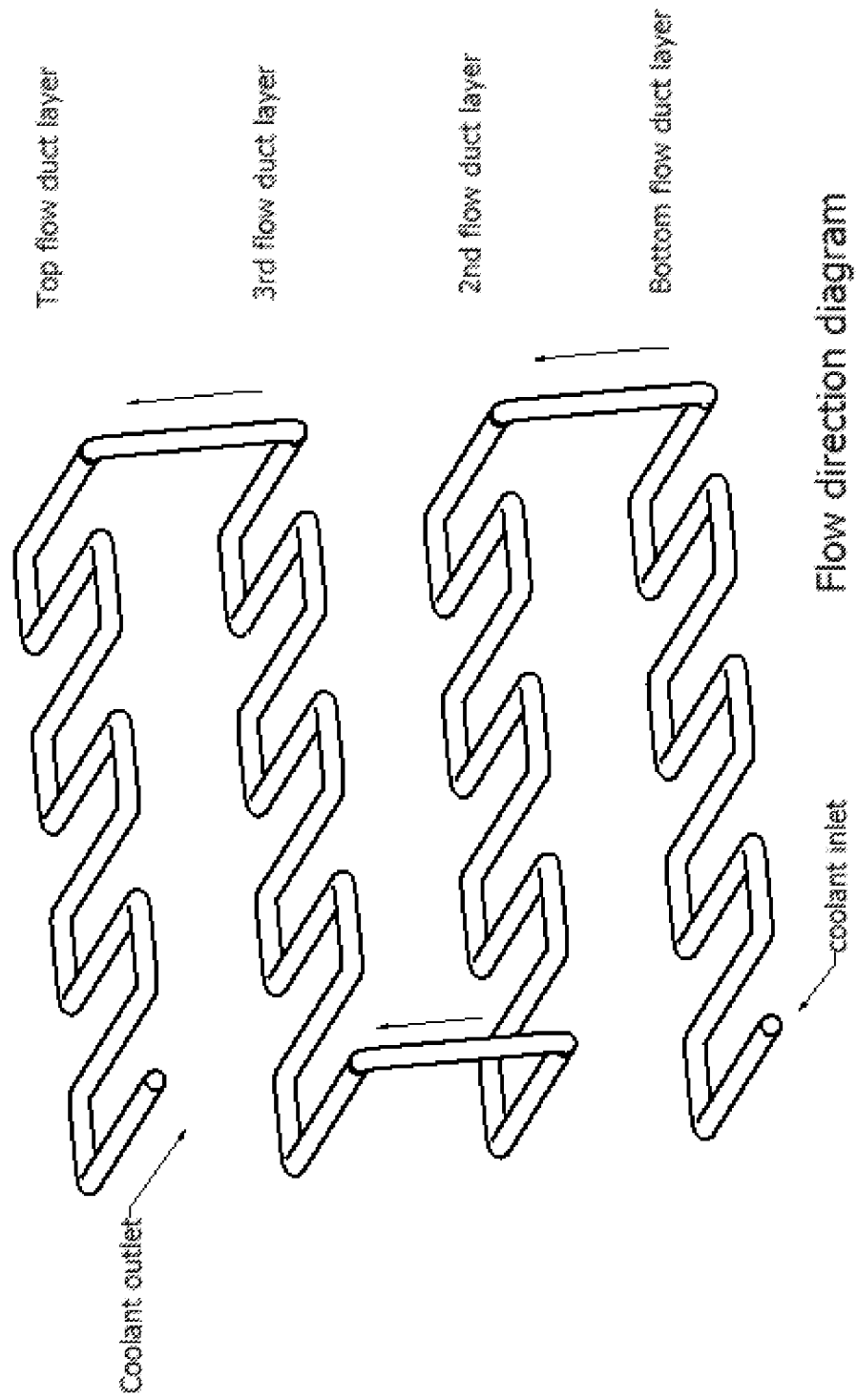
FIG. 23 is flow direction diagram.
Figure 29:
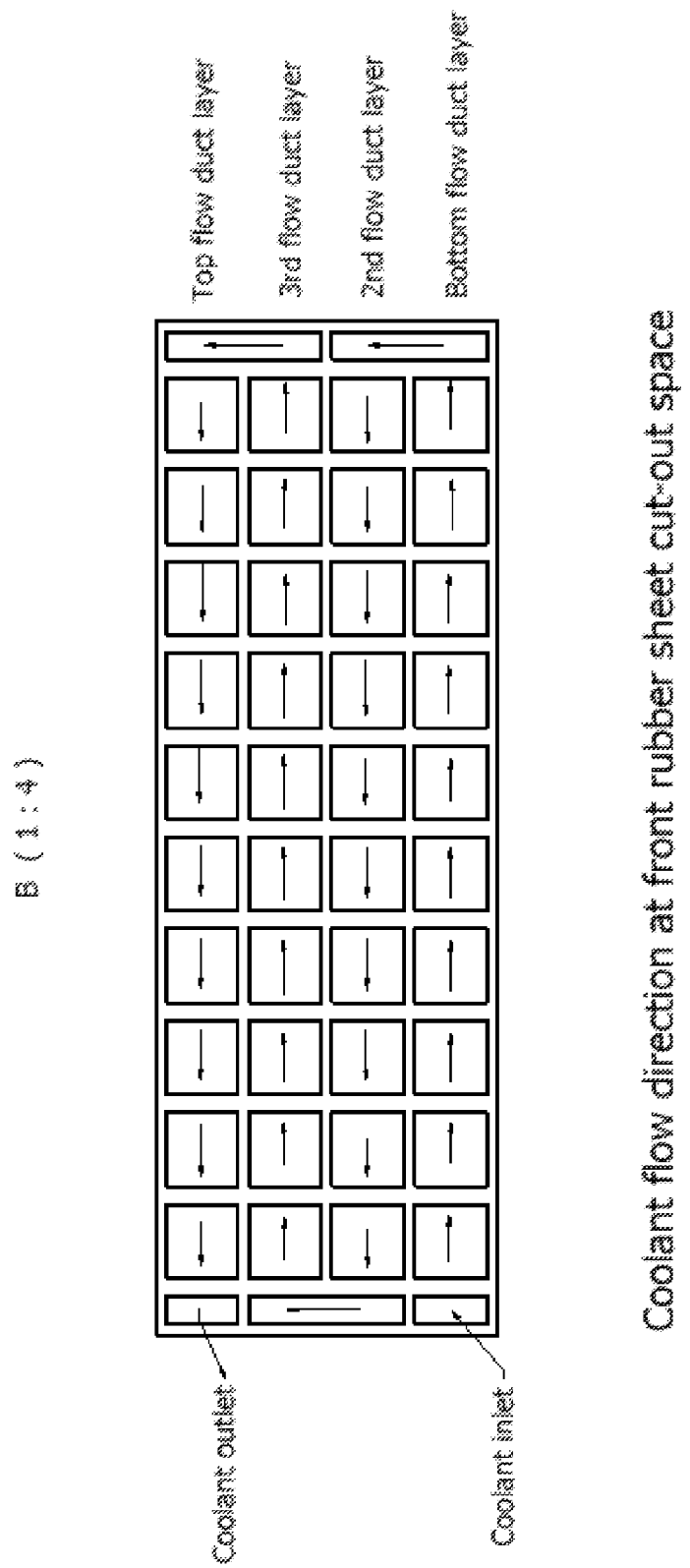
FIG. 29 is a front view-B of FIG. 28 to show coolant flow direction at front rubber sheet cut-out space.
Figure 30:
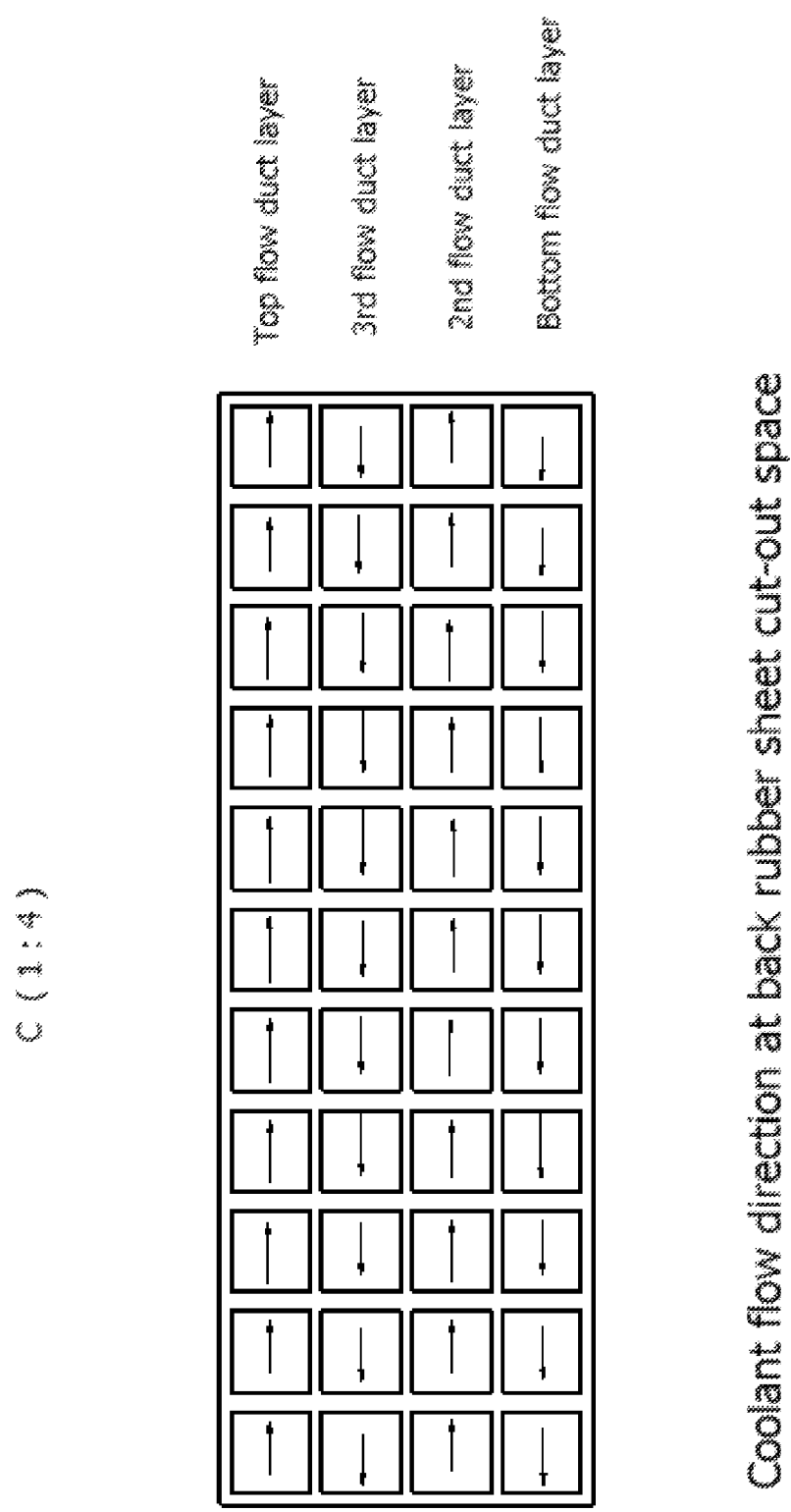
FIG. 30 is a back view-C of FIG. 28 to show coolant flow direction at back rubber sheet cut-out space.
Figure 31:
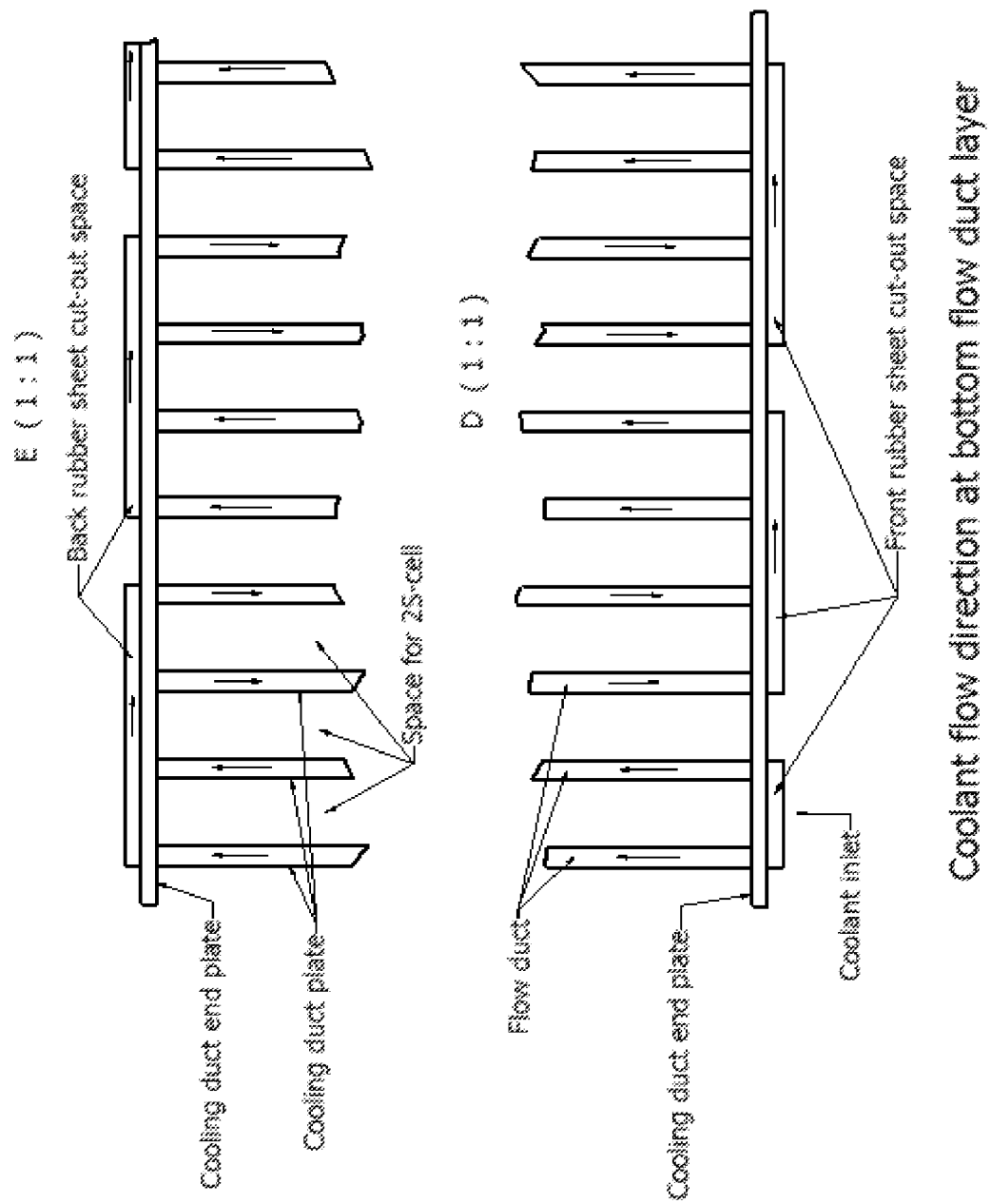
FIG. 31 is a detail view-D & E of FIG. 28 to show coolant flow direction at bottom flow duct layer.

FIG. 23 shows the schematic flow of the coolant in the cooling grid array in the battery pack. For simplification, the single cylindrical pipe-like structure represents the path of two flow ducts. The locations of the flow ducts are depicted in FIG. 24 to FIG. 27. With the connection of both the front and back cover with their respective rubber sheets, the flow of the coolant will be able to change direction at the rubber sheet cut-out space. How the front rubber sheet is able to change the flow direction is depicted in FIG. 29, and how the back rubber sheet is able to change direction is depicted in FIG. 30. FIG. 31 shows the flow direction at the bottom flow duct layer.

This apparatus is able to carry coolant to each individual cell evenly, effectively and efficiently in a simple design, extending the lifespan of the battery and enhancing its safety.

The total weight of the battery pack (FIG. 22), including ~13 kg of coolant, is ~350 kg.

Its dimensions are L=1031 mm, W=509 mm, H=445 mm.

The battery pack is lightweight but strong, with a voltage of 320V, energy capacity of 32 kWh, energy to weight ratio of ~91 Wh/kg, and energy to volume ratio of ~137 Wh/L. These specifications will be able to meet requirements in most EV applications.

The present-day EV battery packs are produced by the various carmakers in a variety of forms. This results in higher costs from a lack of economies of scale, and no interchangeability of batteries between cars from different manufacturers.

If battery packs were standardized, it would be able to be easily adapted to fit different vehicles. The state grid can possibly produce a standardized battery pack rather than the carmakers themselves, and there are benefits to be reaped in a number of ways.

Centralized facilities for producing, charging and maintaining battery packs will result in economies of scale, giving cost savings to both consumers and producers. Battery packs can be charged at power stations during off-peak hours and delivered to petrol kiosks. In place of filling up petrol, consumers can merely replace their batteries at petrol kiosks, leaving their flat batteries to be picked up and charged by the state grid. This will also extend the range of EVs.

With a central charging facility delivering fully-charged battery packs to petrol kiosks, governments need not spend money to build charging stations at different locations, resulting in substantial savings. Also, consumers need not worry about the serviceability and maintenance of their batteries, as the state grid will handle these.

This approach will reduce the price of EVs dramatically and hence promote market growth. Carmakers only need to design future cars to be able to accommodate a standard battery pack.

The concept and structure of this power battery pack cooling apparatus can also apply to other future implementations and applications requiring compact and lightweight battery packs, or applications requiring effective cooling systems under space constraints.

The embodiments of the invention in which an exclusive property or privilege is claimed are as defined as follows:

1. A power battery pack cooling apparatus, comprising:
  a cooling grid array comprising a plurality of cooling duct plates having divided hollow flow ducts for coolant to pass through, wherein the plurality of cooling duct plates have two ends, and two cooling duct end plates having cut-out slots, wherein the two ends of the plurality of cooling duct plates are respectively coupled with the two cooling duct end plates through the cut-out slots, forming a leak-proof joint;
  a front cover having a coolant inlet and outlet that enable the coolant to flow into and out of the cooling apparatus, wherein the front cover is provided with an attached front rubber sheet with a front cut-outs pattern having a plurality of front cut-outs, wherein the front rubber sheet is attached onto one of the two cooling duct end plates, thereby a plurality of enclosed front cut-out spaces are formed by the plurality of the front cut-outs between the front cover and the cooling duct end plate; and
  a back cover with an attached back rubber sheet with a back cut-outs pattern having a plurality of back cut-outs, wherein the back cut-outs pattern is different from the front cut-outs pattern, and wherein the back rubber sheet is attached onto the other of the two cooling duct end plates, thereby a plurality of enclosed back cut-out spaces are formed by the plurality of the back cut-outs between the back cover and the cooling duct end plate;
  whereby the enclosed front and back cut-out spaces are so arranged in their relative positions to the divided hollow flow ducts so as to facilitate the flow and direction change of the coolant in the divided hollow flow ducts.

2. The power battery pack cooling apparatus of claim 1, wherein at least one of the plurality of the front cut-outs covers more than two divided hollow flow ducts.

3. The power battery pack cooling apparatus of claim 1, wherein at least one of the plurality of the back cut-outs covers more than two divided hollow flow ducts.

* * * * *